(12) United States Patent
Haartsen

(10) Patent No.: US 7,848,446 B2
(45) Date of Patent: Dec. 7, 2010

(54) REDUCTION OF PEAK-TO-AVERAGE-POWER RATIO IN A TELECOMMUNICATIONS SYSTEM

(75) Inventor: Jacobus Cornelis Haartsen, Hardenberg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 928 days.

(21) Appl. No.: 11/684,683

(22) Filed: Mar. 12, 2007

(65) Prior Publication Data

US 2008/0075191 A1    Mar. 27, 2008

Related U.S. Application Data

(60) Provisional application No. 60/827,093, filed on Sep. 27, 2006.

(51) Int. Cl.
  H04B 15/00    (2006.01)
(52) U.S. Cl. ..................................... 375/285
(58) Field of Classification Search ............... 375/260, 375/267, 285, 295, 299, 344, 346, 350, 261, 375/296, 347; 370/208, 328, 335, 350, 203, 370/205, 206, 210, 480
  See application file for complete search history.

(56) References Cited

U.S. PATENT DOCUMENTS

| | | | |
|---|---|---|---|
| 5,381,449 | A | 1/1995 | Jasper et al. |
| 5,493,587 | A | 2/1996 | Sandri et al. |
| 5,894,498 | A | 4/1999 | Kotzin et al. |
| 6,185,220 | B1 * | 2/2001 | Muthukrishnan et al. ... 370/411 |
| 6,298,094 | B1 | 10/2001 | Dehner et al. |
| 6,445,747 | B1 | 9/2002 | Jafarkhani et al. |
| 6,636,555 | B1 | 10/2003 | Frank et al. |
| 6,721,349 | B1 | 4/2004 | Willenegger et al. |

(Continued)

FOREIGN PATENT DOCUMENTS

EP    1 424 822 A2    6/2004

(Continued)

OTHER PUBLICATIONS

PCT International Search Report, dated May 28, 2008, in connection with International Application No. PCT/EP2007/060215.

(Continued)

*Primary Examiner*—David C Payne
*Assistant Examiner*—Syed Haider
(74) *Attorney, Agent, or Firm*—Potomac Patent Group PLLC

(57) ABSTRACT

A single-carrier signal is generated from a number, N, of symbols in a way that results in a low PAPR. This includes generating an initial set of N complex frequency components from the N symbols. $N_s$ different sets of N complex frequency components are generated by, for each of $N_s$ times, permuting the initial set of N complex frequency components by one of $N_s$ possible permutations. $N_s$ different sets of M complex frequency components are generated by mapping each of the $N_s$ different sets of N complex frequency components onto a set of M carrier frequencies. After shaping, an IDFT generates a candidate set of N time-domain symbols from each of the $N_s$ different sets of M complex frequency components. That one of the $N_s$ different candidate sets of N time-domain symbols that is associated with the smallest PAPR is selected for further processing.

30 Claims, 18 Drawing Sheets

U.S. PATENT DOCUMENTS

| | | | |
|---|---|---|---|
| 7,061,991 | B2 | 6/2006 | Wright et al. |
| 2003/0028844 | A1 | 2/2003 | Coombs |
| 2003/0202460 | A1 | 10/2003 | Jung et al. |
| 2004/0008616 | A1 | 1/2004 | Jung et al. |
| 2005/0243938 | A1* | 11/2005 | Armstrong et al. .......... 375/260 |
| 2006/0034378 | A1 | 2/2006 | Lindskog et al. |
| 2006/0104373 | A1 | 5/2006 | Bar-Ness et al. |
| 2006/0262870 | A1* | 11/2006 | Khan ......................... 375/260 |
| 2006/0262871 | A1* | 11/2006 | Cho et al. ................... 375/260 |
| 2007/0004465 | A1* | 1/2007 | Papasakellariou et al. ... 455/571 |

FOREIGN PATENT DOCUMENTS

EP          1 659 722  A1     5/2006

OTHER PUBLICATIONS

PCT Written Opinion, dated May 28, 2008, in connection with International Application No. PCT/EP2007/060215.

3GPP Technical Report TR 25.814 V1.2.0, Technical Specification Group Radio Access Network; Physical Layer Aspects for Evolved UTRA (Release 7), Feb. 2006.

Breiling, M. et al., "SLM Peak-Power Reduction without Explicit Side Information". IEEE Communications Letters, No. 6, 2001, pp. 239-241.

Saito, M. et al., "Peak-to-Average Power Ratio Reduction Method Suitable for MC-CDMA System Downlink." IEEE 16th International Symposium on Personal, Indoor and Mobile Radio Communications, 2005, pp. 286-290.

Hill, G. et al., "Reducing the peak-to-average power ratio on OFDM by cyclically shifting partial transmit sequences." Electronic Letters, Mar. 2000, vol. 36, No. 6, pp. 560-561.

* cited by examiner

REDUCTION OF PEAK-TO-AVERAGE-POWER RATIO IN A TELECOMMUNICATIONS SYSTEM

CROSS REFERENCE TO RELATED APPLICATIONS

This application claims the benefit of U.S. Provisional Application No. 60/827,093, filed Sep. 27, 2006, which is hereby incorporated herein by reference in its entirety.

BACKGROUND

The present invention relates to power amplification in electronic equipment, and more particularly to methods and apparatuses for reducing the peak-to-average-power ratio of a signal to be amplified.

Power amplification remains an issue of much research in electronics, and is especially important in telecommunications. Where telecommunications equipment is operated by a time-limited power supply, such as a battery (e.g., in a mobile phone or other User Equipment—"UE"), the efficiency of the power amplifier (PA) that amplifies the signal to be transmitted (e.g., uplink signals sent by UE to a base station—"BS") largely determines the talk time of the equipment. The PA is by nature a non-linear component, as can be seen from the typical power transfer function ($P_{out}$ vs. $P_{in}$) shown in FIG. 1. In order not to distort the signal, the signal amplitude excursions should remain in the linear region (e.g., the region to the left of the dotted line 101 in FIG. 1). Distortion of the signal gives rise to spectral (re-)growth outside the signal bandwidth. Signal power is thereby spread outside the intended bandwidth, which gives rise to leakage into one or more adjacent channels.

Signals that have little variation in amplitude (so-called "constant-envelope signals") are therefore preferred because the operating point of the PA can be placed high in the linear region, where the efficiency of the PA is high. If the signal amplitude varies much, the operating point of the PA has to be moved downwards, so that strong signal excursions will still remain in the linear region. But, by backing-off the operating point of the PA, its efficiency is detrimentally lowered.

The ratio between the maximum signal excursion and the average excursion of a signal is expressed by the Peak-to-Average-Power Ratio (PAPR). The PAPR is therefore a measure of the extent to which peak values of a signal are larger than typical values. In mobile telephony, modulation formats with a low PAPR have been very popular. For example, the Global System for Mobile communication (GSM) uses Gaussian Minimum Shift Keying (GMSK) modulation, which results in a modulated signal having a PAPR of 0 dB because its amplitude remains constant (the information is represented only in the phase of the signal: Continuous Phase Modulation or CPM). However, in order to increase the data rate and obtain higher link capacities (in b/s/Hz), higher-order modulation (HOM) is unavoidable. This requires not only that the phase be modulated, but the amplitude as well, resulting in larger PAPR. For example, modulation schemes up to 64-QAM have been introduced in systems complying with the High Speed Downlink Packet Access (HSDPA) standards. Similarly, modulation schemes up to 16-QAM have are being investigated for use in High Speed Uplink Packet Access (HSUPA) systems.

Very high PAPR levels are found in multi-carrier technologies like Orthogonal Frequency Division Multiplexing (OFDM). These technologies have gained popularity in new systems under development like those compliant with the Worldwide Interoperability for Microwave Access (WiMAX) standards and the 3$^{rd}$ Generation Partnership Project (3GPP) Long Term Evolution (LTE). In LTE, the standard working group has chosen a multi-carrier, OFDM scheme for use in the downlink transmissions (from BS to UE), but a single-carrier modulation scheme (QPSK, 16-QAM, and 64-QAM) for use in the uplink transmissions. The latter has a much better PAPR than OFDM. PA efficiency is crucial in the battery-powered UE.

Although single-carrier modulation schemes are associated with better (i.e., lower) PAPR values than do multi-carrier modulation schemes like OFDM, the need for efficiency can still present problems in single-carrier modulation-based equipment because higher-order modulation technologies generate signals having a higher PAPR than do constant-envelope modulation technologies like GMSK. In particular, for higher data rates, higher power levels are required in order to keep the energy per bit at a reasonable level (i.e., sufficient to cover the distance that the radio waves need to travel). A high PA efficiency is, therefore, mandatory not only to achieve efficient battery power usage, but also to keep the heat caused by power dissipation at reasonably low levels. Therefore, there is a need for methods and apparatuses that will reduce the PAPR of modulated signals in single-carrier communication systems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that generate a single-carrier signal from a number, N, of symbols. This involves using a Discrete Fourier Transform (DFT) to generate an initial set of N complex frequency components from the N symbols. $N_s$ different sets of permuted complex frequency components are generated by, for each of $N_s$ times, permuting a derived set of complex frequency components by one of $N_s$ possible permutations, where $2 \leq N_s \leq N!$, wherein the derived set of complex frequency components is derived from the initial set of N complex frequency components. $N_s$ candidate sets of at least N time-domain symbols are then generated by, for each of the $N_s$ sets of derived permuted frequency components, using an Inverse Discrete Fourier Transform (IDFT) to generate a candidate set of at least N time-domain symbols from a respective one of the $N_s$ sets of derived permuted complex frequency components, wherein each of the sets of derived permuted complex frequency components is derived from the set of permuted complex frequency components. It is then ascertained which one of the $N_s$ different candidate sets of at least N time-domain symbols is associated with a smallest Peak-to-Average-Power Ratio (PAPR). That one of the $N_s$ different candidate sets of at least N time-domain symbols that is associated with the smallest PAPR is then selected for further processing. Further processing can include, for example, using the selected at least N time-domain symbols in a process that generates an analog signal; and transmitting the analog signal.

In some embodiments permuting a derived set of complex frequency components by one of $N_s$ possible permutations comprises cyclically shifting the derived set of complex frequency components by one of $N_s$ possible shift amounts, $S_i$, wherein $0 \leq S_i \leq (N-1)$ and $S_i \neq S_j$ for $i \neq j$, $0 \leq i \leq (N_s-1)$, $0 \leq j \leq (N_s-1)$.

In some of these embodiments, the different possible shift amounts, $S_i$, have values that are evenly distributed between 0 and N−1. For example, in some embodiments $N_s=2$, $S_0=0$ and $S_1=(N/2)$. In some other embodiments, $N_s=4$, $S_0=0$, $S_1=(N/4)$, $S_2=(N/2)$, and $S_3=(3N/4)$.

In some alternative embodiments, permuting a derived set of complex frequency components by one of $N_s$ possible permutations comprises using one of $N_s$ possible binary permutations to reorder complex frequency components of the derived set of complex frequency components. The type of binary permutation may be, for example, a butterfly permutation.

In another aspect, the derived set of complex frequency components are identical to the initial set of complex frequency components.

In other alternatives, the derived set of complex frequency components are derived from the set of initial complex frequency components by performing a process that includes repeatedly mapping the N complex frequency components of the initial set of N complex frequency components onto different groups of N carrier frequencies selected from among M carrier frequencies until each of the M carrier frequencies is associated with one of the N complex frequency components.

In such embodiments, another aspect involves deriving each of the sets of derived permuted complex frequency components from the set of permuted complex frequency components by performing a process that includes using a shaping filter to reduce PAPR.

In yet another aspect, each of the sets of derived permuted complex frequency components are derived from the set of permuted complex frequency components by performing a process that includes generating $N_s$ different sets of M complex frequency components, where $N \leq M$, by, for each of the $N_s$ different sets of N permuted complex frequency components, repeatedly mapping the N permuted complex frequency components onto different groups of N carrier frequencies selected from among M carrier frequencies until each of the M carrier frequencies is associated with one of the N complex frequency components.

In such embodiments, another aspect involves using a shaping filter to reduce PAPR as at least part of the process for deriving each of the sets of derived permuted complex frequency components from the set of permuted complex frequency components.

In yet other embodiments, each of the sets of derived permuted complex frequency components are derived from the set of permuted complex frequency components by performing a process that includes generating $N_s$ different sets of M complex frequency components, where $N \leq M$, by, for each of the $N_s$ different sets of N permuted complex frequency components, mapping the N permuted complex frequency components onto every Kth carrier selected from among M carrier frequencies, wherein K=M/N.

In such embodiments, another aspect comprises converting the selected at least N time-domain symbols into an analog signal, and shaping the analog signal to reduce the PAPR.

In still other alternative embodiments, the set of derived complex frequency components are derived from the set of initial complex frequency components by performing a process that includes generating a set of M complex frequency components, where $N \leq M$, by mapping the N complex frequency components of the initial set of complex frequency components onto every Kth carrier selected from among M carrier frequencies, wherein K=M/N.

In such embodiments, another aspect includes converting the selected at least N time-domain symbols into an analog signal, and shaping the analog signal to reduce the PAPR.

In yet another aspect, information is communicated to a receiver, wherein the information identifies which of the $N_s$ possible permutations was used to generate the selected candidate set of at least N time-domain symbols.

In yet another aspect, receiving a single-carrier signal involves using a Discrete Fourier Transform (DFT) to generate an initial set of at least N complex frequency components from a number of received information samples. Side information that identifies a selected one of $N_s$ possible permutations is received, where $2 \leq N_s \leq N!$. A set of permuted complex frequency components are then generated by permuting the initial set of at least N complex frequency components by the selected one of $N_s$ possible permutations. A set of at least N time-domain symbols are then generated by applying an Inverse Discrete Fourier Transform (IDFT) to the set of permuted complex frequency components.

In alternative embodiments, receiving a single-carrier signal involves using a Discrete Fourier Transform (DFT) to generate an initial set of at least N complex frequency components from a number of received information samples. $N_s$ different sets of permuted complex frequency components are generated by, for each of $N_s$ times, permuting the initial set of at least N complex frequency components by one of $N_s$ possible permutations, where $2 \leq N_s \leq N!$. A blind detection technique is then used to determine which of the $N_s$ different sets of permuted complex frequency components is a selected one of the $N_s$ different sets of permuted complex frequency components. A set of at least N time-domain symbols are generated by applying an Inverse Discrete Fourier Transform (IDFT) to the selected one of the $N_s$ different sets of permuted complex frequency components.

BRIEF DESCRIPTION OF THE DRAWINGS

The objects and advantages of the invention will be understood by reading the following detailed description in conjunction with the drawings in which.

DETAILED DESCRIPTION

Figure 1:
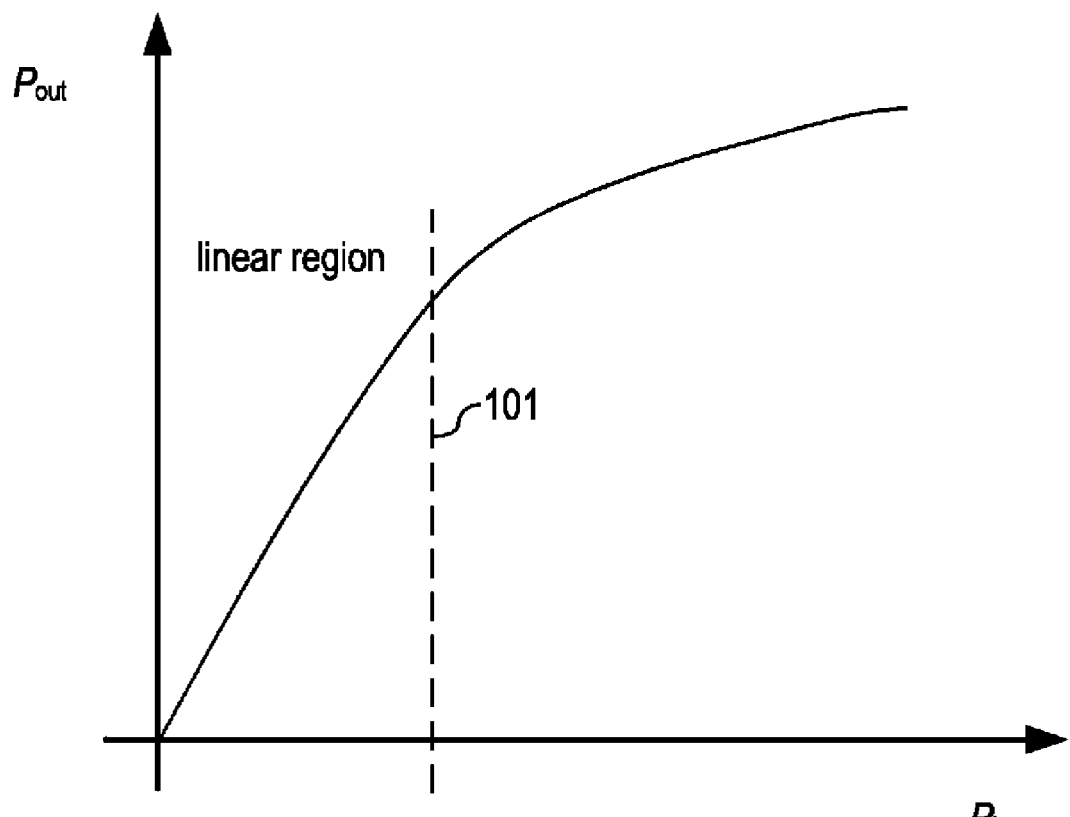
FIG. 1 is a graph of a typical power transfer function ($P_{out}$ vs. $P_{in}$) of a power amplifier.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In an aspect of embodiments consistent with the invention, the PAPR of a single-carrier signal can be reduced considerably (e.g., 2-3 dB) by processing the signal as follows. First, a series of N ordinary Quadrature Amplitude Modulation (QAM) symbols is generated. These N time domain symbols are then converted into an equivalent frequency domain representation using the Discrete Fourier Transform (DFT) (which, as used herein, includes, but is not limited to, the Fast Fourier Transform, "FFT"). This results in N complex frequency components. From these frequency components, N different frequency realizations are produced by cyclic shifting the frequency components with a shift ranging from 0 to N−1. Each realization is subsequently mapped back into the time domain using an Inverse Discrete Fourier Transform (IDFT) (which, as used herein, includes, but is not limited to, the Inverse Fast Fourier Transform, "IFFT"), thereby rendering N time domain realizations. The time domain realization corresponding to a shift of 0 corresponds to the original time series, so it is not strictly necessary to obtain this time domain realization from the DFT-IDFT process. Then, the PAPR of each time domain realization is determined and that time domain realization having the lowest PAPR is selected for transmission.

In another aspect of embodiments consistent with the invention, the receiver also performs particular operations to receive the signal. For example, before demodulation, the reverse (cyclic) shift is applied in the frequency domain.

The transmitter and receiver should use the same shift value for the information to be conveyed accurately. Since the receiver cannot know in advance what the shift value will be (it is dynamically determined, as explained above) one way of addressing this problem is to send the shift value used by the transmitter to the receiver in parallel with the transmitted data signal. This is herein called "side-information." Typically, the side information is carried in a packet header that uses a robust modulation method. Preferably, a simple modulation scheme (e.g., QPSK or BPSK) is used with an inherently low PAPR, so the inventive process described herein is not applied to the side information. As an alternative to transmitting side information, the receiver can apply blind detection. By analyzing the results obtained from different shift amounts, the receiver can detect the one shift value that produces the constellation points corresponding to the used QAM scheme.

In yet another aspect of embodiments consistent with the invention, implementation complexity can be reduced greatly by noting that it is not necessary to consider all N possible shifts. This is because great PAPR reductions can be obtained even with only from four to eight possible shift values.

These and other aspects will now be described in greater detail.

For the sake of example, the invention will be described with reference to the uplink transmissions of the LTE system, which is currently being defined in the 3GPP LTE standards group. However, the various aspects of the invention are by no means limited to use in only this exemplary system. Rather, the apparatuses and methods described herein are applicable in any communication system employing single-carrier modulation strategies.

Figure 2:
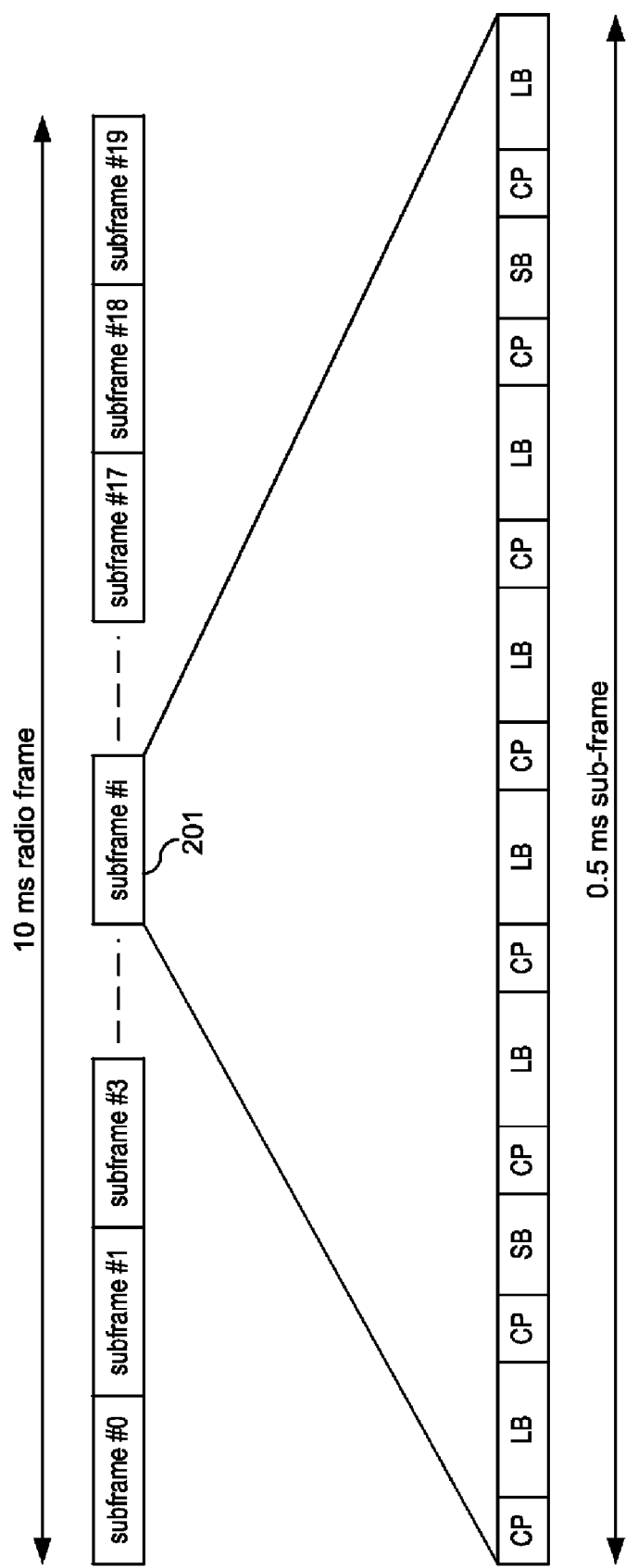
FIG. 2 is a block diagram of an exemplary signal format for use in the uplink direction in a 3GPP LTE communication system.

In order to obtain an acceptable PAPR, the 3GPP LTE standards group has selected a single-carrier modulation strategy for use in the uplink direction with modulation schemes QPSK, 16-QAM, and 64-QAM. A block diagram of the exemplary uplink format is shown in FIG. 2. The uplink format defines a 10 ms radio frame that is divided into 20 uplink sub-frames (e.g., the sub-frame #i 201) of 0.5 ms duration each. A sub-frame contains 6 long blocks (LB) and 2 short blocks (SB). The long blocks contain user and control information. The short blocks contain reference signals for training the receiver (e.g. timing/frequency correction, channel estimation). A cyclic prefix (CP) is added to each block in order to allow channel equalization to be carried out in the frequency domain. The cyclic prefix is just a repetition of the last part of the block and makes the block rotationally symmetric.

Figure 3A:
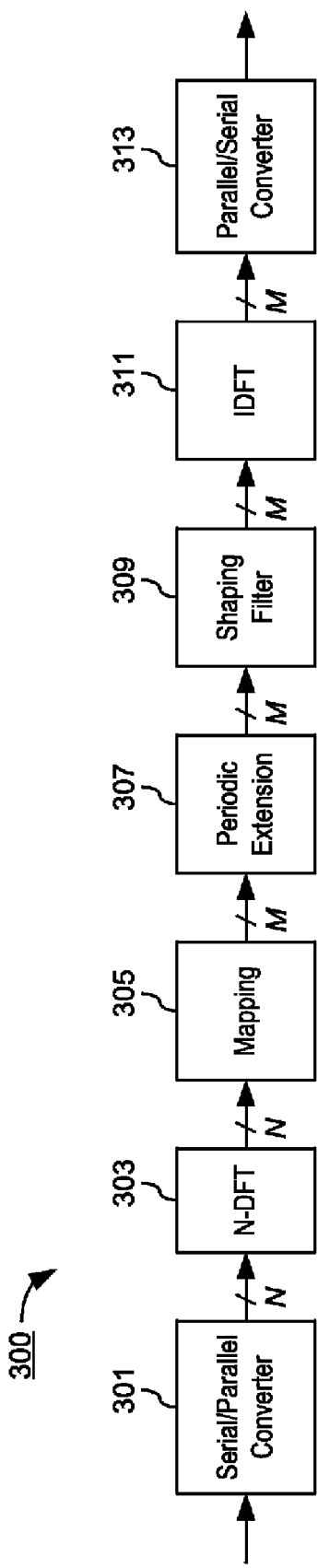
FIG. 3a is a block diagram of an exemplary localized-FDMA transmitter.
Figure 3B:
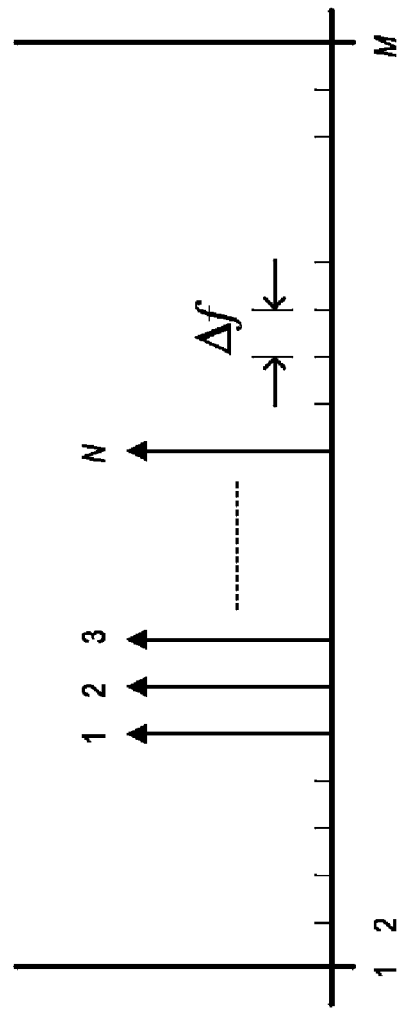
FIG. 3b is a graph showing an exemplary localized-FDMA transmitter's allocation of N consecutive carriers within a transmission bandwidth of M carriers.

FIG. 3a is a block diagram of an exemplary UE transmitter 300. Since the timing format uses blocks with cyclic prefixes, frequency domain processing is possible. An input series of N symbols is applied to a serial-to-parallel converter 301 to generate N parallel symbols. An N-point DFT 303 is applied to the N parallel symbols to convert the time domain signal into a frequency domain signal comprising N frequency components. A mapper 305 then maps the N frequency components to a position in an M-point transmission bandwidth (N≦M). The LTE standards allow frequency scheduling: a user can be allocated a block of N consecutive carriers somewhere in the transmission bandwidth of M carriers, as illustrated in FIG. 3b. To take an example, with a DFT carrier spacing Δf of 15 kHz, and M=1024, the transmission bandwidth is about 17 MHz and the channel corresponding to the N components can be placed anywhere within this bandwidth. The parameter N≦M determines the allocated channel bandwidth. The M-N outputs of the mapper 305 to which no inputs are mapped remain zero. This structure results in the well-known Frequency Division Multiple Access (FDMA) method of distinguishing one entity's transmissions from those of another. In LTE systems, the mapping of N contiguous channels as just described is referred to as "localized FDMA."

Figure 4:
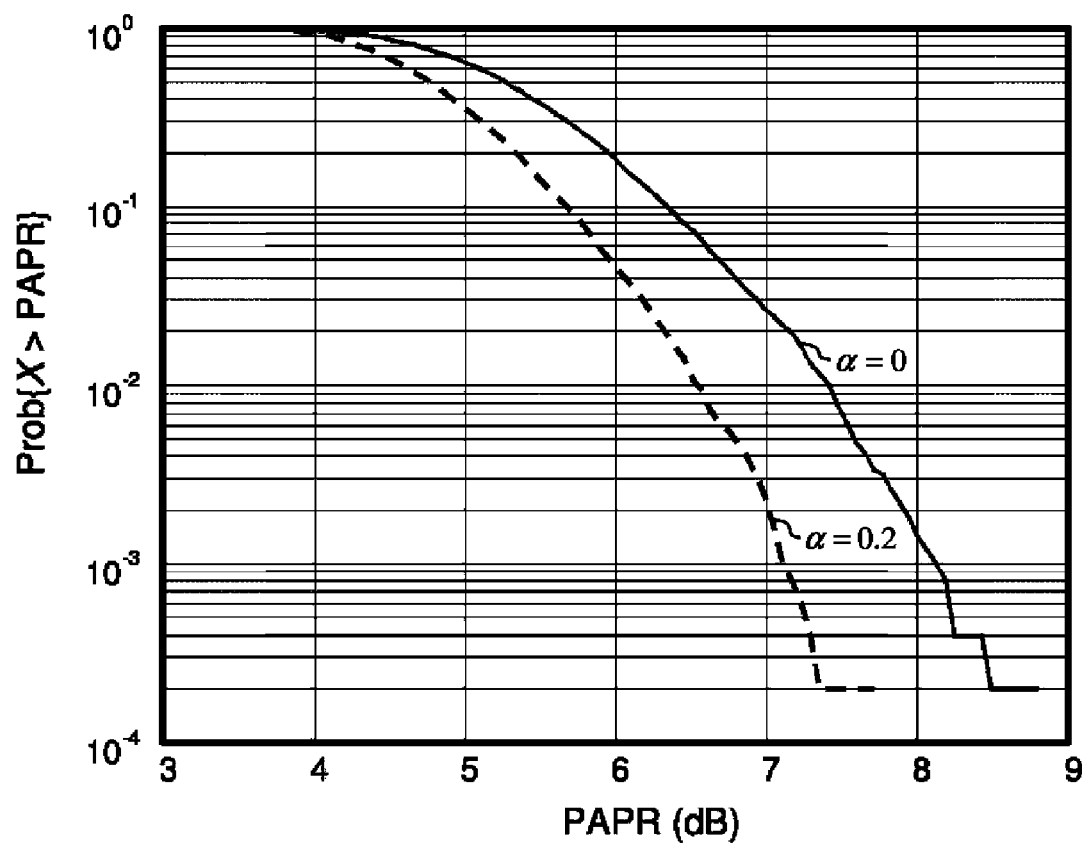
FIG. 4 shows two graphs comparing the Complementary Cumulative Distribution Function (CCDF) of the PAPR of a 16-QAM signal, with shaping factors $\alpha=0$ and $\alpha=0.2$.
Figure 5:
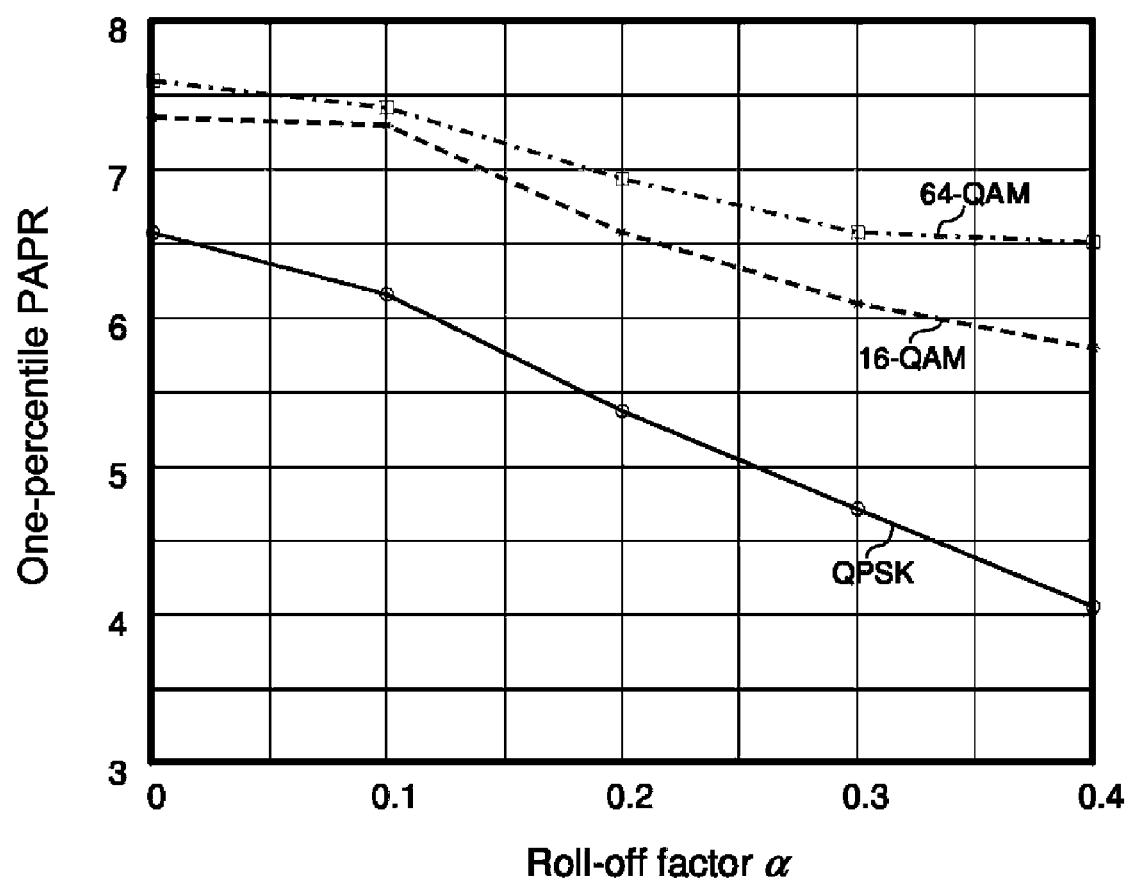
FIG. 5 is a set of graphs showing, for each of three different types of modulation schemes, how increasing the roll-off factor, $\alpha$, of a shaping filter in a localized-FDMA transmitter reduces the PAPR of the generated signal.

A well-known technique for reducing the PAPR of the signal generated by a localized FDMA transmitter is to shape the signal. The shaping corresponds to filtering the system with a filter function that does not affect the timing features of the signal (like the Nyquist characteristics which guarantee timing that is free of Inter-Symbol Interference—"ISI"). A Root-Raised Cosine (RRC) filter function is usually used for this purpose. If the receiver also applies an RRC filter, the overall response is Raised Cosine (RC), which preserves the Nyquist characteristics. The roll-off factor α of the RRC filter determines the amount of filtering, with α=0 corresponding to a perfect brick wall filter, and α=1 corresponding to maximal filtering. FIG. 4 shows two graphs comparing the Complementary Cumulative Distribution Function (CCDF) of the PAPR of a 16-QAM signal, with shaping factors α=0 and α=0.2. The PAPR is normally determined for the 1% or 0.1% threshold (meaning that the instantaneous peak-to-average ratio will be larger than the PAPR value on the X-axis in only 1% or 0.1% of the cases). Increasing the roll-off factor α of the shaping filter reduces the PAPR. This can be seen in FIG. 5, which is a set of three graphs showing, for each of three modulation formats (QPSK, 16-QAM, and 64-QAM) the one-percentile PAPR plotted as a function of roll-off factor α. However as α is increased, so is the bandwidth of the transmitted signal. Since the FDMA method requires that different UEs use adjacent channels to remain orthogonal, a larger α requires a larger frequency spacing between adjacent carriers, resulting in reduced system capacity. Therefore, α cannot be made too large (α is usually on the order of 0.2 to 0.4).

Figure 6A:
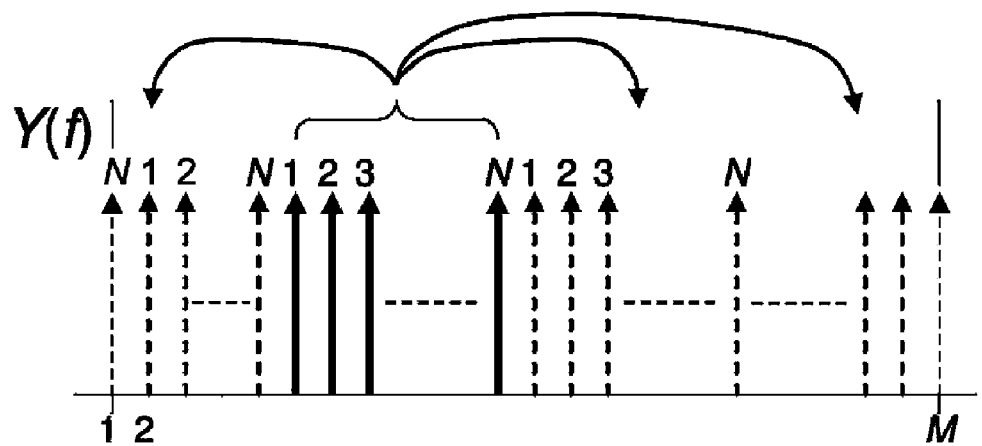
FIG. 6a is a graph of an exemplary expansion and allocation of N transmission carriers over M carriers.
Figure 6B:
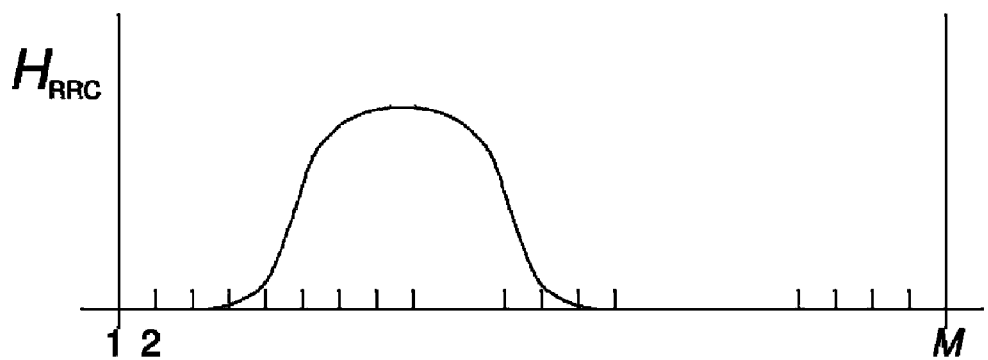
FIG. 6b is a graph of an exemplary filter function $H_{RRC}(f)$
Figure 6C:
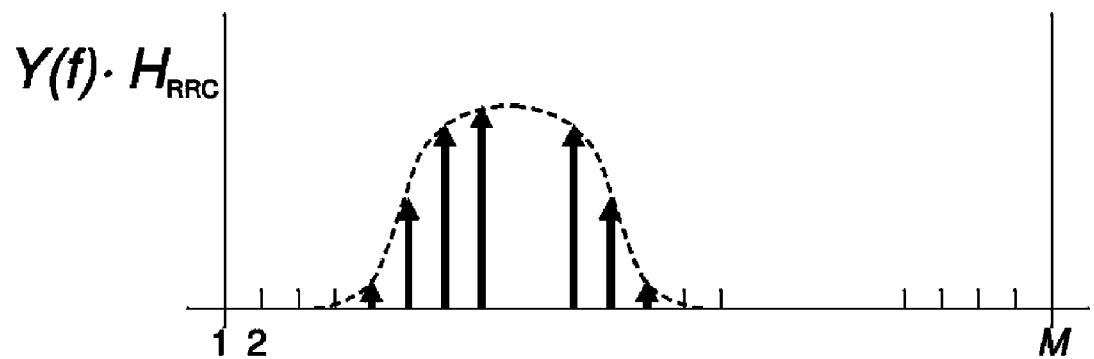
FIG. 6c is a graph showing exemplary results of shaping M transmission carriers by the exemplary filter function $H_{RRC}(f)$.

With the implementation of FIG. 3a, shaping can be applied by a shaping filter 309 in the frequency domain. The shaping filter 309 multiplies the frequency components by suitable amounts to achieve the desired filtering. However, since the shaping broadens the bandwidth, the N frequency components first need to be repeated and expanded to occupy all M transmission carriers. This is performed by the periodic extension logic 307. Exemplary results of this operation are shown in the graph of FIG. 6a. Only after the N frequency components have been repeated across all M transmission carriers does the shaping filter 309 operate to multiply them by a RRC filter function $H_{RRC}(f)$. FIG. 6b is a graph of an exemplary filter function $H_{RRC}(f)$, and FIG. 6c is a graph showing exemplary results of shaping by this filter.

After the shaping, the signal is converted back to the time domain by an Inverse Discrete Fourier Transform (IDFT) 311. The time-domain signal generated by the IDFT 311 is then converted back into a serial stream of data by a parallel-to-serial converter 313. Additional processing (not depicted in FIG. 3a) includes adding a cyclic prefix, ramping up the power of the header of the data block, ramping down the power of the trailer of the data block, and converting the resultant digital signal into an analog signal.

Figure 7:
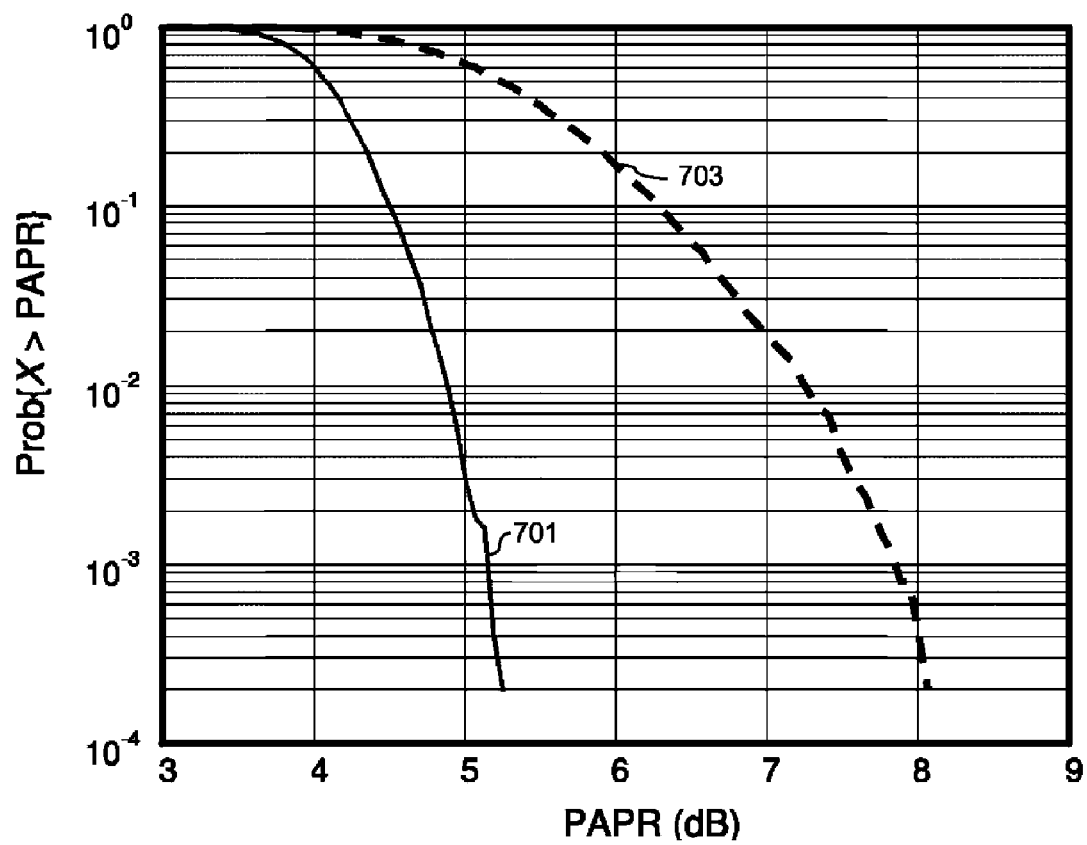
FIG. 7 depicts two graphs showing exemplary CCDF values plotted as a function of PAPR for the case with and without a rotational shift being applied.

According to an aspect of embodiments consistent with the invention, the PAPR can be further reduced by suitable cyclic rotation of the N frequency components before mapping, repetition and shaping. More specifically, for N components, N cyclic shifts in either direction are possible ranging from no shift, S=0, up to a shift of S=N−1. A shift of zero corresponds to the original signal. If cyclic shifting of the frequency domain signal is performed prior to mapping, periodic extension, and shaping, then the PAPR of the resultant time domain data block will be different for different shift values. This can be used advantageously by selecting that shift which gives the lowest (or at least a lower) PAPR. FIG. 7 depicts two graphs showing exemplary CCDF values plotted as a function of PAPR for the case with (graph 701) and without (graph 703) a rotational shift being applied (in these examples, N=32). In this example, the rotational shift is the one achieving the maximum reduction of PAPR. Clearly, large gains can be obtained by applying the proper shift during processing.

Figure 8:
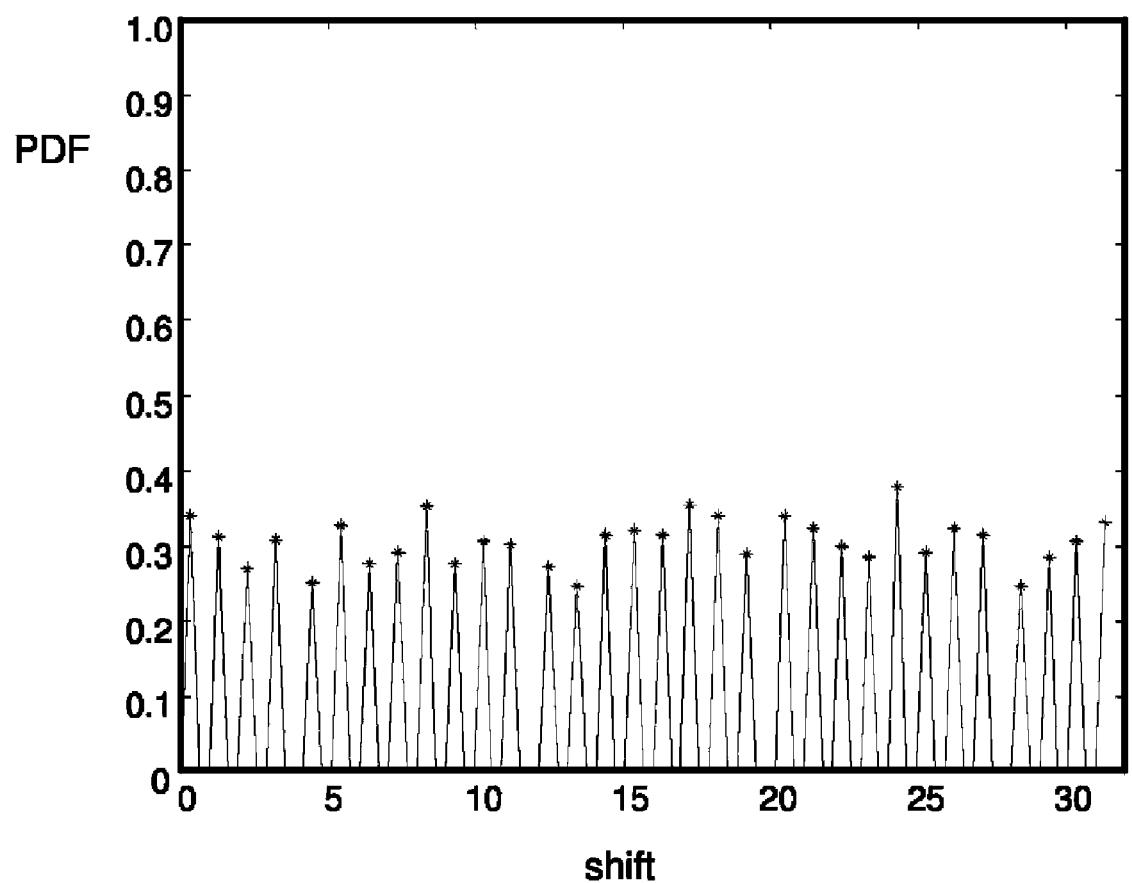
FIG. 8 is an exemplary graph based on test results showing the likelihood of a given shift yielding the best reduction of PAPR.

FIG. 8 is an exemplary graph based on test results showing, for each of 32 possible shifts, the probability density function (pdf) representing the probability of that shift yielding the best reduction of PAPR. As can be seen, the shifts are distributed quite evenly over all possible shifts. This means that there is no particular shift that is used more often than others.

The number of possible shifts increases linearly with N. Embodiments can be implemented that test the results from all possible shifts, to ascertain which achieves the maximum reduction of PAPR. However, as N becomes large, the amount of processing required to make this determination may be more than is permissible for the device.

Figure 9:
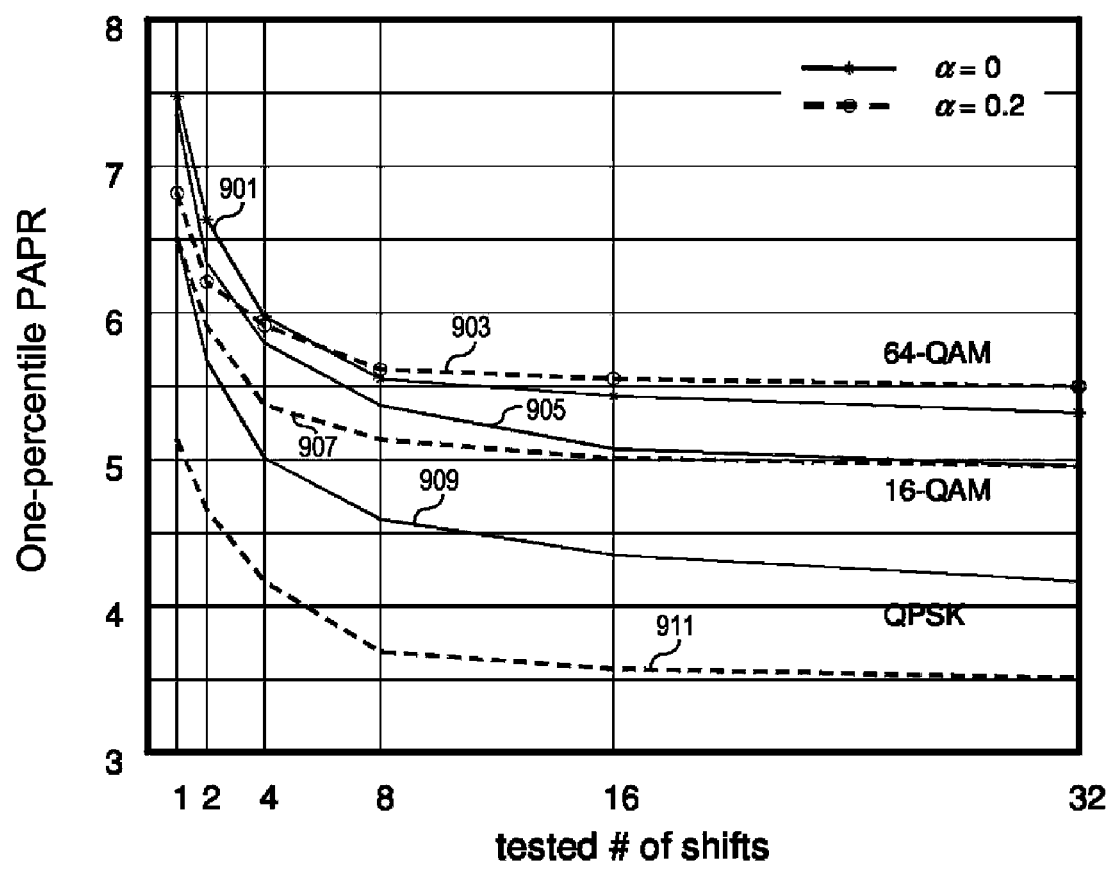
FIG. 9 is a set of six graphs showing, for each of six combinations of modulation format and roll-off factor (α), the one-percentile PAPR plotted as a function of the number of shifts tested.

Fortunately, it can be shown that considerable gains can be obtained with only a limited number $N_s$ of shifts being tested. It is preferred that the shift values be evenly distributed over the N possibilities, but this is not essential. For example, if it is desired to test only two shifts ($N_s$=2), the two shifts selected for testing could be S=0 and S=N/2. If four shifts are to be tested ($N_s$=4), the four shifts selected for testing could be S=0, S=N/4, S=N/2, and S=3N/4. Of course, other even distributions could alternatively be used. FIG. 9 is a set of six graphs showing, for each of six combinations of modulation format and roll-off factor (α), the one-percentile PAPR plotted as a function of the number of shifts tested. In particular, graph 901 shows the case for 64-QAM with α=0; graph 903 shows the case for 64-QAM with α=0.2; graph 905 shows the case for 16-QAM with α=0; graph 907 shows the case for 16-QAM with α=0.2; graph 909 shows the case for QPSK with α=0; and graph 911 shows the case for QPSK with α=0.2. In this example, with N=32 and 16-QAM, most of the gain that is obtainable by shifting is obtained when only eight shifts are tested.

Another factor that can be considered when deciding upon the number of shifts that will be tested in any given implementation is its impact on network utilization. At the receiver side, the original signal needs to be generated from the received signal. Doing this requires an opposite shift in the frequency domain, but the shift to be performed at any given time is a function of the data being transmitted, and cannot therefore be pre-programmed into the receiver. In some embodiments, each shift associated with a given block of data is expressly communicated from the transmitter to the receiver as what is herein referred to as "side information." When the number of tested shifts is limited to, for example, only 4 or 8 shifts out of a greater number of possible shifts (e.g., N=32), then only 2 or 3 bits, respectively, of side information would be needed to inform the receiver of which opposite shift to perform. It is preferable to design each system so that the amount of side information is as small as possible while still achieving a desired level of PAPR reduction.

Figure 10:
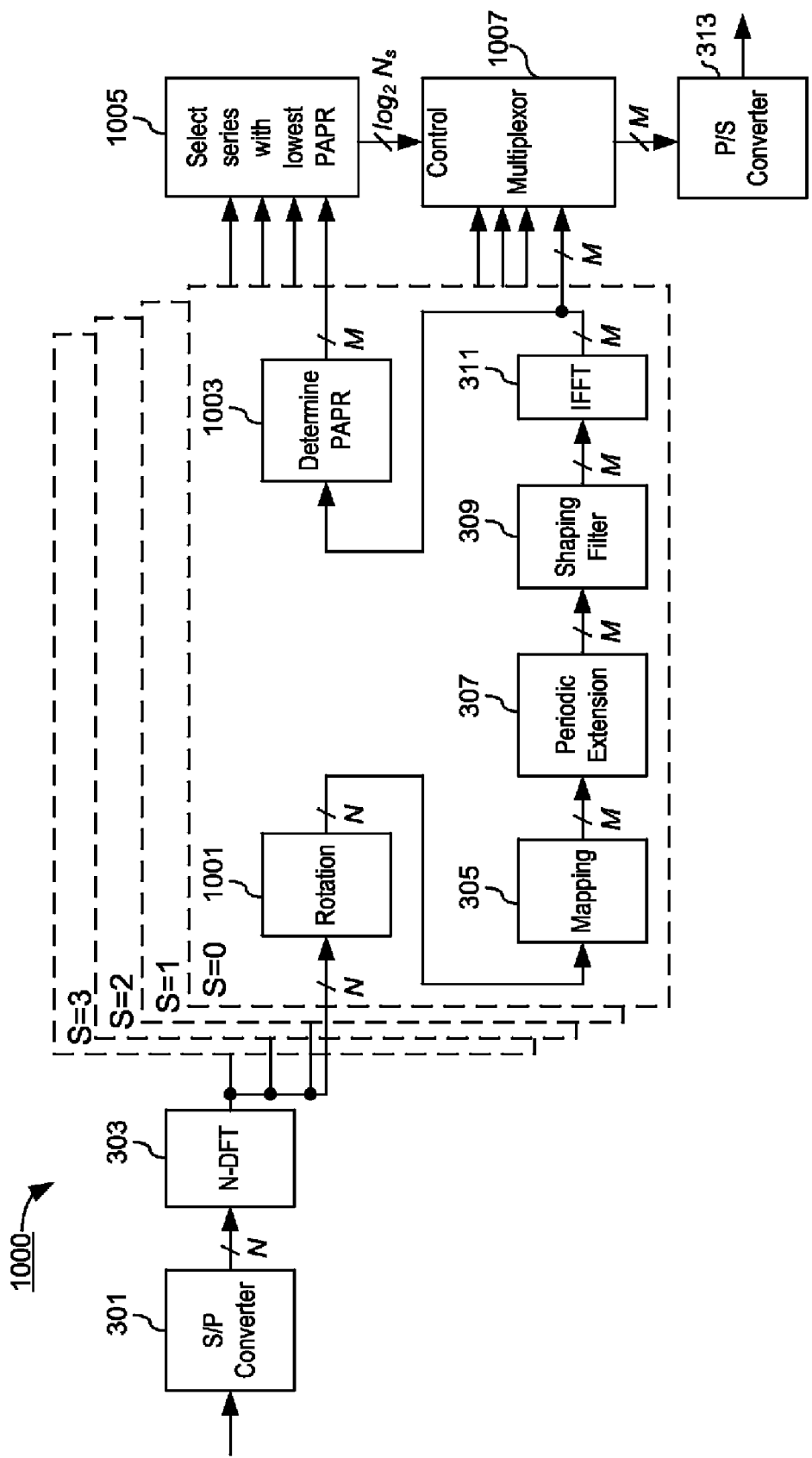
FIG. 10 is a block diagram of an exemplary localized-FDMA transmitter that achieves PAPR reduction in accordance with aspects of the invention.

FIG. 10 is a block diagram of an exemplary localized-FDMA transmitter 1000 that achieves PAPR reduction in accordance with aspects of the invention. An input series of N symbols is applied to a serial-to-parallel converter 301 to generate N parallel symbols. An N-point DFT 303 is applied to the N parallel symbols to convert the time domain signal into a frequency domain signal comprising N frequency components. In this exemplary embodiment, the output from the DFT 303 is supplied to each of $N_s \leq N$ parallel branches (e.g., $N_s=4$ as depicted in FIG. 10), each branch corresponding to one of the $N_s$ different shifts to be tested. In addition to the mapper 305, the periodic extension logic 307, shaping filter 309, and IDFT 311 as described earlier, each branch includes rotation logic 1001 for circularly shifting (rotating) the N frequency components by one of the $N_s$ possible shifts. For the case in which S=0 (i.e., no shifting), the rotation logic 1001 can be omitted since it leaves the N frequency components unchanged. In each branch, the shifted frequency components are supplied as input to the mapper 305. After mapping, processing then proceeds through the periodic extension logic 307, shaping filter 309, and IDFT 311 as described earlier. In addition, the time-domain signal generated by the IDFT 311 is analyzed by PAPR determination logic 1003, the output of which is supplied to one of $N_s$ inputs of selection logic 1005 that determines which of the $N_s$ PAPRs is lowest. A code indicating which of the $N_s$ PAPRs is lowest is supplied to a control input port of a multiplexor 1007. Each branch also supplies the time-domain signal generated by the IDFT 311 to one of the inputs of the multiplexor 1007. The code supplied at the control input of the multiplexor 1007 causes the time-domain signal that had the lowest PAPR to appear at the output of the multiplexor 1007. This signal is then converted back into a serial stream of data by a parallel-to-serial converter 313. Additional processing (not depicted in FIG. 10) may include adding a cyclic prefix, ramping up the power of the header of the data block, ramping down the power of the trailer of the data block, and converting the resultant digital signal into an analog signal.

It can be seen, then, that the function of the exemplary logic is to determine the PAPR of each candidate shift, and to then use and transmit the shifted signal associated with the lowest PAPR. Alternative embodiments exist that give the same results. For example, the rotational shift could also be applied on the N non-zero components after the mapping (i.e., rotation logic 1001 could follow the mapper 305 instead of precede it). In another alternative, the rotational shift could be applied over all M components after the periodic extension. The cyclic shift would be applied over the entire set of M carriers, but since the M carriers show a periodic pattern with period N, there are still only N possible different shift results. Each of these different approaches gives the same end result. For this reason, this specification denotes the range of shift values, $S_i$, as $0 \leq S_i \leq N-1$, and intends this expression to also represent the case when $0 \leq S_i \leq M-1$ with only N possible unique outcomes being generated from the M possible different shift values.

At the receiver side, the original QAM signal needs to be generated. This requires an opposite shift in the frequency domain. One way of doing this is by communicating the selected shift as side information. When the number of tested shifts is limited to 4 or 8 shifts, only 2 or 3 bits of side information, respectively, are needed. Alternatively, blind detection can be performed to determine the number of shifts that need to be performed to accurately reconstruct the original QAM signal. In such embodiments, the receiver tests the different possible shifts, and selects the most likely one. This can be achieved by logic in the receiver that determines how well differently shifted versions of the received signal map to the expected constellation diagram. For example, for a 16-QAM signal, each received symbol must map to one of the 16 constellation points in the complex 16-QAM constellation diagram. Only the proper shift will result in this proper mapping. Since all N symbols in one block are transmitted with the same shift, the receiver can average over N constellation points in order to increase the detection probability under low signal-to-noise ratio (SNR) conditions.

Figure 11:
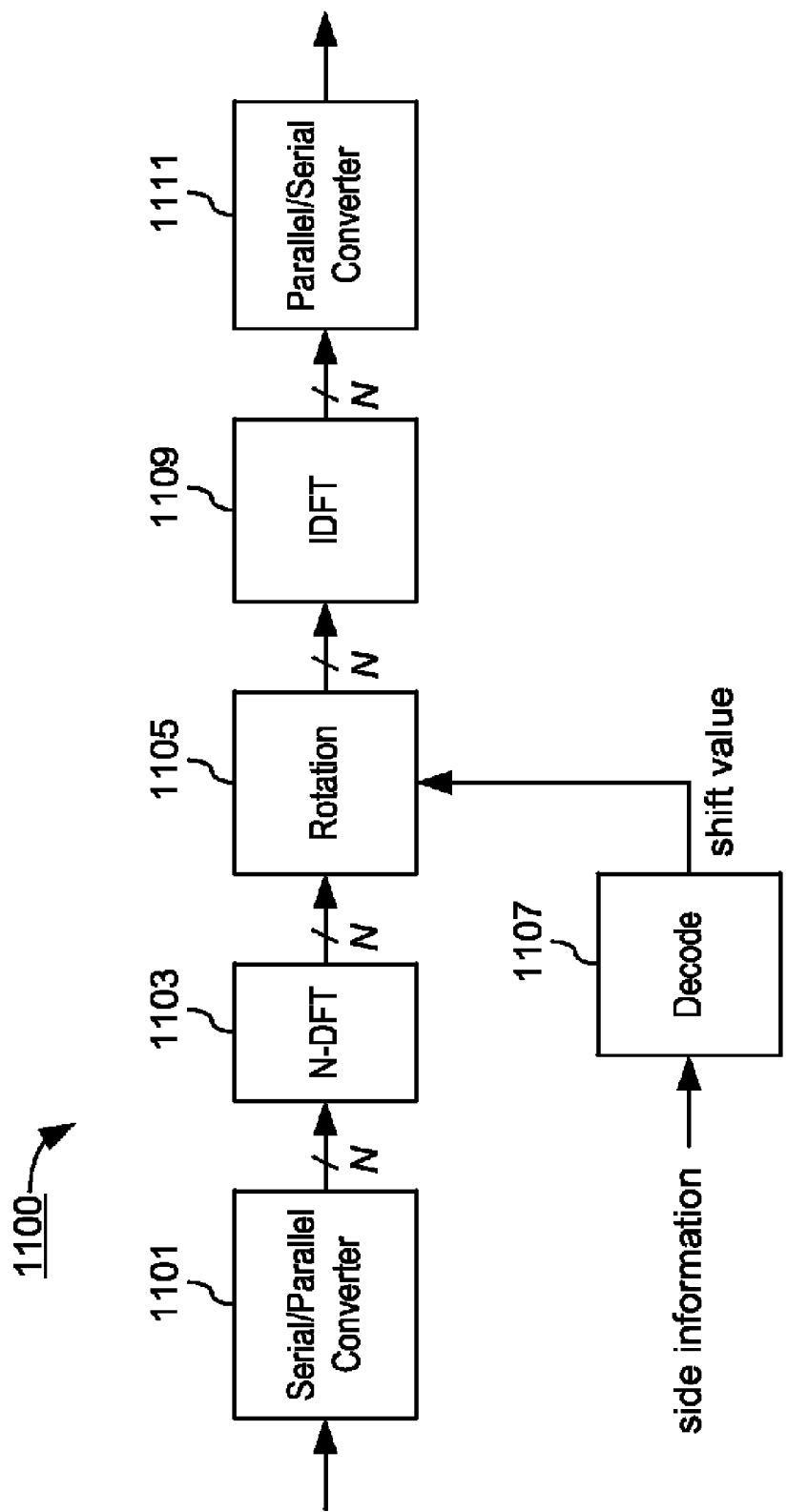
FIG. 11 is a block diagram of an exemplary receiver that conforms to aspects of the invention.

FIG. 11 is a block diagram of an exemplary receiver 1100 that conforms to aspects of the invention. After demodulation, the serial stream of N received information samples (e.g., symbols) is applied to a serial-to-parallel converter 1101 to generate N parallel information samples. An N-point DFT 1103 is applied to the N parallel information samples to convert the time domain signal into a frequency domain signal comprising N frequency components. These N frequency components are supplied to an input of rotation logic 1105 for circularly shifting (rotating) the N frequency components by one of the $N_s$ possible shifts. The amount of shifting to be performed is supplied by a decoder 1107, which receives the side information (e.g., obtained by any of the means described above) and converts this into a signal adapted to control the rotation logic 1105. The shifted signal supplied at the output of the rotation logic 1105 is then converted back to the time domain by an IDFT 1109. The time-domain signal generated by the IDFT 1109 is then converted back into a serial stream of data by a parallel-to-serial converter 1111.

The simple example illustrated in FIG. 11 assumes that no shaping was applied to the transmitted signal. Had shaping been applied, the spectrum would have been broader than just N carriers, and could have involved as many as M carriers (i.e., $N \leq M$). To handle such cases, the embodiment illustrated in FIG. 11 could be modified such that the DFT and IDFT each have a size larger than N, with data widths being modified accordingly. To notate the more general cases, embodiments can be described as involving an L-DFT and an L-IDFT, wherein $N \leq L$.

So far, the mapping scheme of FIG. 3b has been considered. In this case, when mapping the N-point DFT output to the M-point IDFT input, a consecutive block of N adjacent carriers is used. This corresponds to traditional FDMA and, in systems compliant with 3GPP LTE standards, is called "localized FDMA." In alternative embodiments, a different mapping can be achieved in which every Kth carrier of the M carriers is used, as illustrated in the graph of FIG. 12b. The carriers in between the N carriers to which the N-point output is mapped are set to zero. For systems compliant with 3GPP LTE standards, K=M/N, so the carriers are evenly spread out. In this way, frequency diversity is maximized because the N original carriers are spread over the entire transmission bandwidth as shown. This is called the distributed FDMA scheme. In the time domain, this means that the signal is compressed in time and then repeated so that the total block length remains the same. The distributed FDMA scheme is envisioned to be used for control information in the LTE uplink. Different users all use the same K-factor, and have a different frequency offset that prevents their frequency components from overlapping. Shaping in the frequency domain (as well as the periodic extension) is not possible because the entire transmission bandwidth is used. Instead, shaping can be applied by a low-pass filter following the D/A conversion (not shown).

Figure 12A:
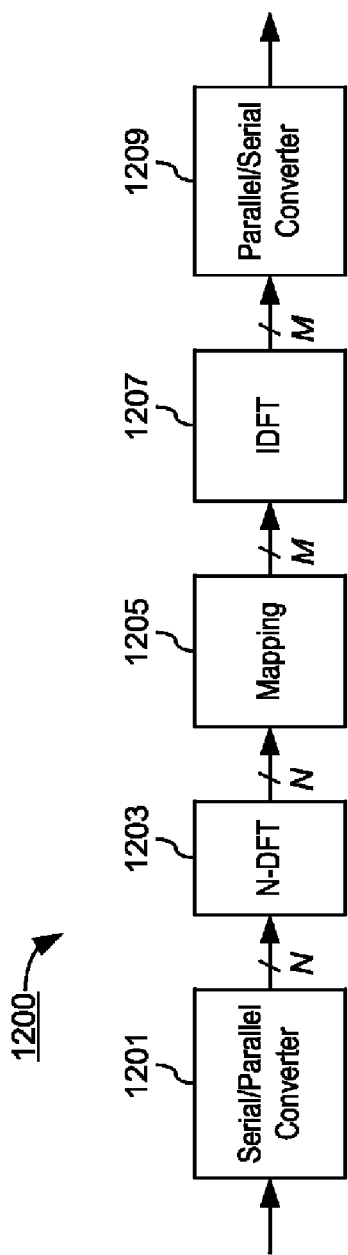
FIG. 12*a* is a block diagram of an exemplary distributed-FDMA transmitter.
Figure 12B:
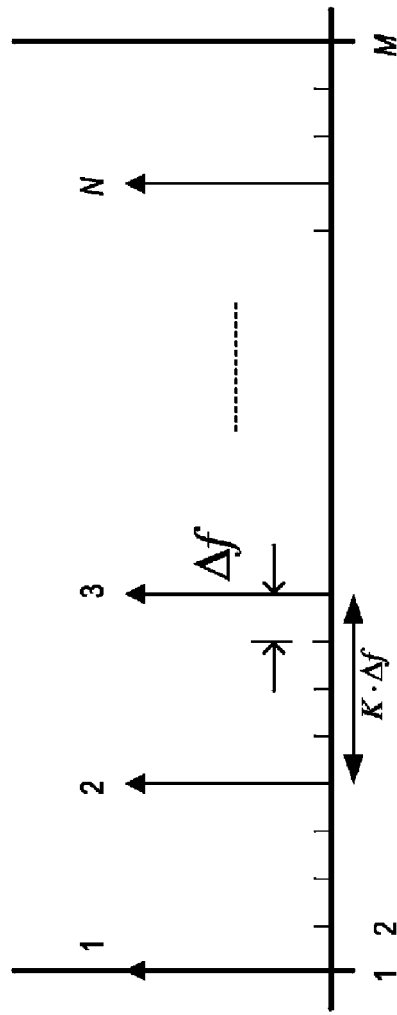
FIG. 12*b* is a graph showing an exemplary distributed-FDMA transmitter's allocation of N frequencies over every Kth carrier of M carriers.

FIG. 12a is a block diagram of an exemplary distributed-FDMA transmitter 1200. An input series of N symbols is applied to a serial-to-parallel converter 1201 to generate N parallel symbols. An N-point DFT 1203 is applied to the N parallel symbols to convert the time domain signal into a frequency domain signal comprising N frequency components. Mapping logic 1205 then maps the N frequency components to a position in an M-point transmission bandwidth (N≦M) as discussed above with reference to FIG. 12b. The signal is converted back to the time domain by an IDFT 1207. The time-domain signal generated by the IDFT 1207 is then converted back into a serial stream of data by a parallel-to-serial converter 1209.

Figure 13:
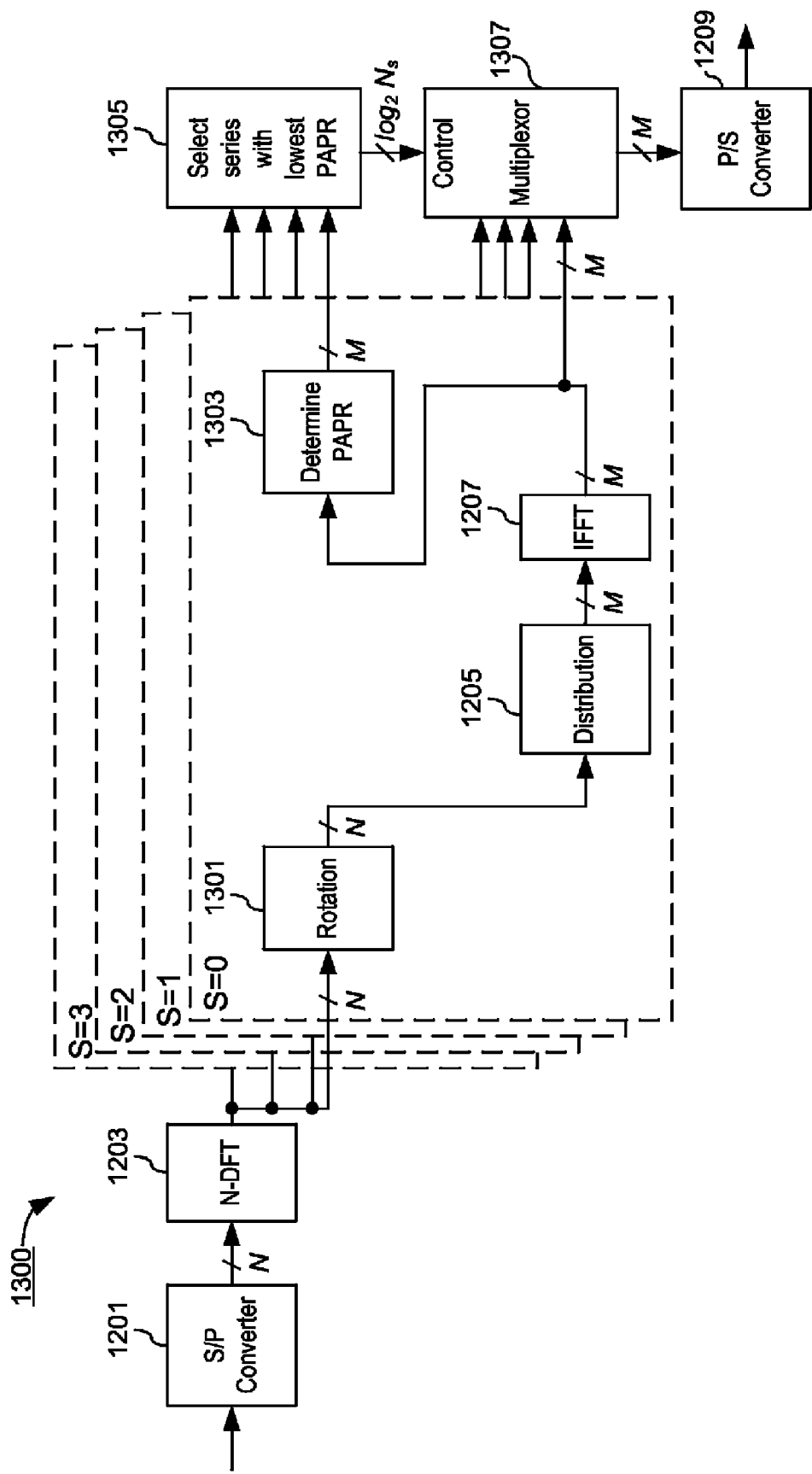
FIG. 13 is a block diagram of an exemplary distributed-FDMA transmitter that achieves PAPR reduction in accordance with aspects of the invention.

In another aspect consistent with the invention, the PAPR reduction method as described above for localized FDMA can also be applied for distributed FDMA. In this case, the step size for the shifts is increased from 1 to K. The same PAPR reduction values as for the localized case can be obtained. An exemplary embodiment of a distributed-FDMA transmitter 1300 is shown in FIG. 13. An input series of N symbols is applied to a serial-to-parallel converter 1201 to generate N parallel symbols. An N-point DFT 1203 is applied to the N parallel symbols to convert the time domain signal into a frequency domain signal comprising N frequency components. In this exemplary embodiment, the output from the DFT 1203 is supplied to each of $N_s \leq N$ parallel branches (e.g., $N_s$=4 as depicted in FIG. 13), each branch corresponding to one of the $N_s$ different shifts to be tested. In addition to the mapping logic 1205 and IDFT 1207 as described earlier, each branch includes rotation logic 1301 for circularly shifting (rotating) the N frequency components by one of the $N_s$ possible shifts. For the case in which S=0 (i.e., no shifting), the rotation logic 1301 can be omitted since it leaves the N frequency components unchanged. In each branch, the shifted frequency components are supplied as input to the mapping logic 1205. After distributing the N frequency components through the M possible carrier frequencies, processing then proceeds through the IDFT 1207 as described earlier. In addition, the time-domain signal generated by the IDFT 1207 is analyzed by PAPR determination logic 1303, the output of which is supplied to one of $N_s$ inputs of selection logic 1305 that determines which of the $N_s$ PAPRs is lowest. A code indicating which of the $N_s$ PAPRs is lowest is supplied to a control input port of a multiplexor 1307. Each branch also supplies the time-domain signal generated by the IDFT 1207 to one of the inputs of the multiplexor 1307. The code supplied at the control input of the multiplexor 1307 causes the time-domain signal that had the lowest PAPR to appear at the output of the multiplexor 1307. This signal is then converted back into a serial stream of data by a parallel-to-serial converter 1209. Additional processing (not depicted in FIG. 13) may include adding a cyclic prefix, ramping up the power of the header of the data block, ramping down the power of the trailer of the data block, and converting the resultant digital signal into an analog signal. Shaping of the analog signal can also be applied by a low-pass filter.

Figure 14:
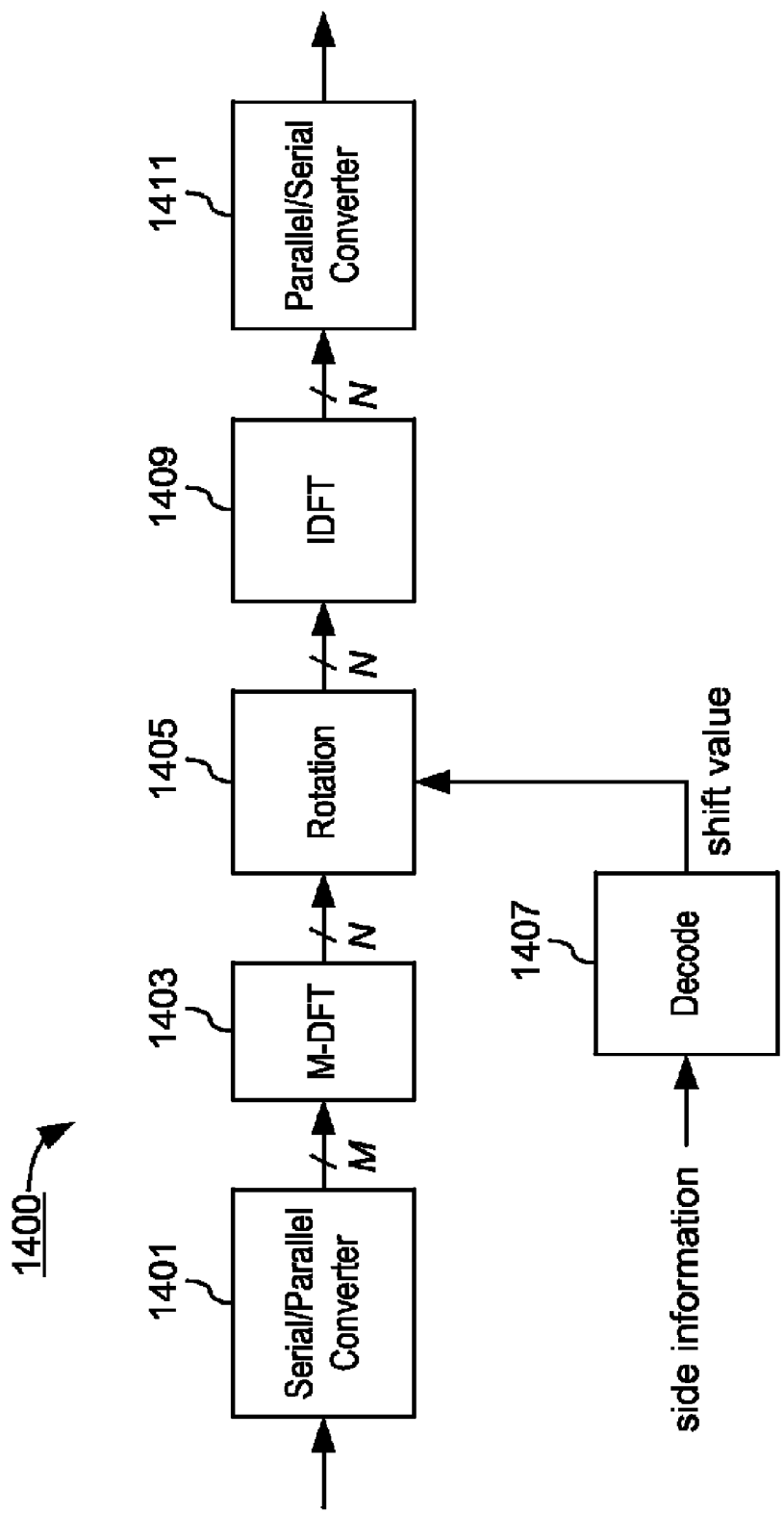
FIG. 14 is a block diagram of another exemplary receiver that conforms to aspects of the invention.

FIG. 14 is a block diagram of another exemplary receiver 1400 for a distributed FDMA system that conforms to aspects of the invention. After demodulation, the serial stream of M received information samples (e.g., symbols) is applied to a serial-to-parallel converter 1401 to generate M parallel information samples. An M-point DFT 1403 is applied to the M parallel information samples to convert the time domain signal into a frequency domain signal comprising N frequency components. It will be noted that although an M-point DFT is being used, only N outputs are of interest. These N frequency components are supplied to an input of rotation logic 1405 for circularly shifting (rotating) the N frequency components by one of the $N_s$ possible shifts. The amount of shifting to be performed is supplied by a decoder 1407, which receives the side information (e.g., obtained by any of the means described above) and converts this into a signal adapted to control the rotation logic 1405. The shifted signal supplied at the output of the rotation logic 1405 is then converted back to the time domain by an IDFT 1409. The time-domain signal generated by the IDFT 1409 is then converted back into a serial stream of data by a parallel-to-serial converter 1411.

Figure 15:
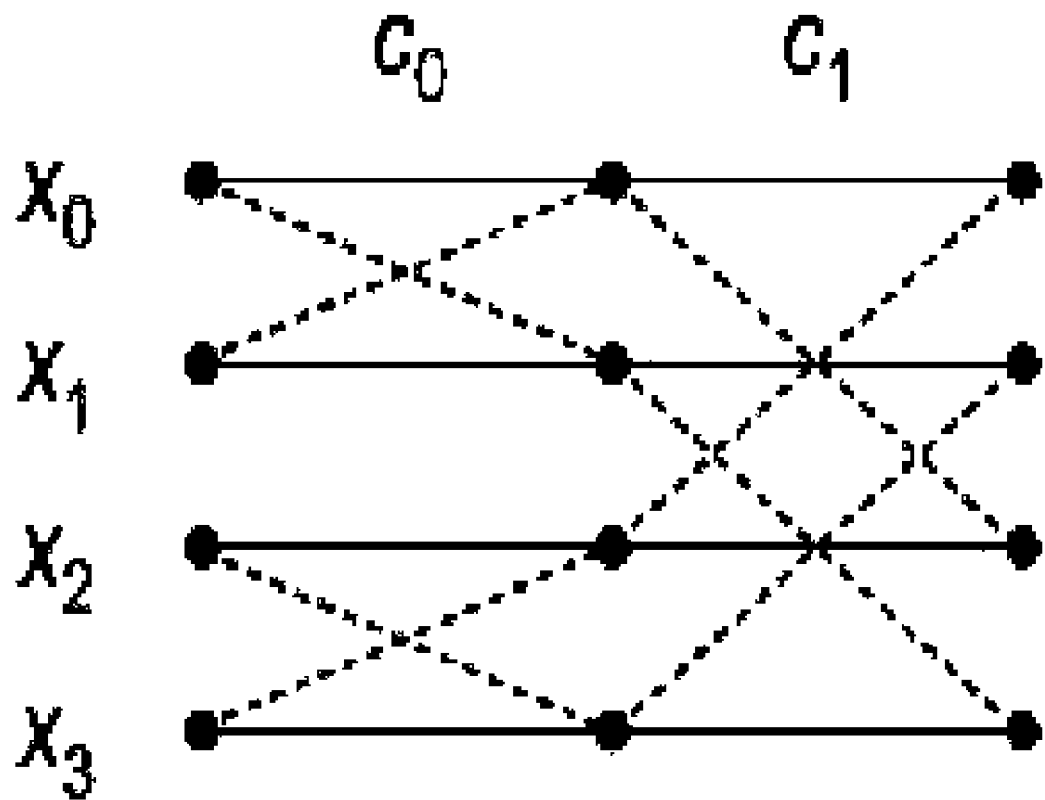
FIG. 15 is a block diagram of an exemplary butterfly switch that can be employed in various embodiments of the invention.

So far, the various embodiments have all employed circular shifting of the frequency components by various amounts to ascertain an ordering of the frequency components that is associated with a lowest PAPR value. However, circular shifting is just one example of permutation operations, any of which can be advantageously employed in alternative embodiments employing aspects of the invention. As an example, another approach that can be used is binary permutation. A butterfly switch construction, similar to those commonly found in FFTs and Walsh-Hadamard Transforms (WHTs), can be used. An exemplary butterfly switch is shown in FIG. 15 for the case in which N=4. Depending on whether the control input $C_i$ is 0 or 1, the straight or diagonal mappings are used, respectively. For the example of FIG. 15, the input {x0, x1, x2, x3 }, would be mapped onto:

$\{x_0, x_1, x_2, x_3\}$ for $c_0c_1=\{0,0\}$;

$\{x_1, x_0, x_3, x_2\}$ for $c_0c_1=\{1,0\}$;

$\{x_2, x_3, x_0, x_1\}$ for $c_0c_1=\{0,1\}$; and $\{x_3, x_2, x_1, x_0\}$ for $c_0c_1=\{1,1 \}$.

Figure 16:
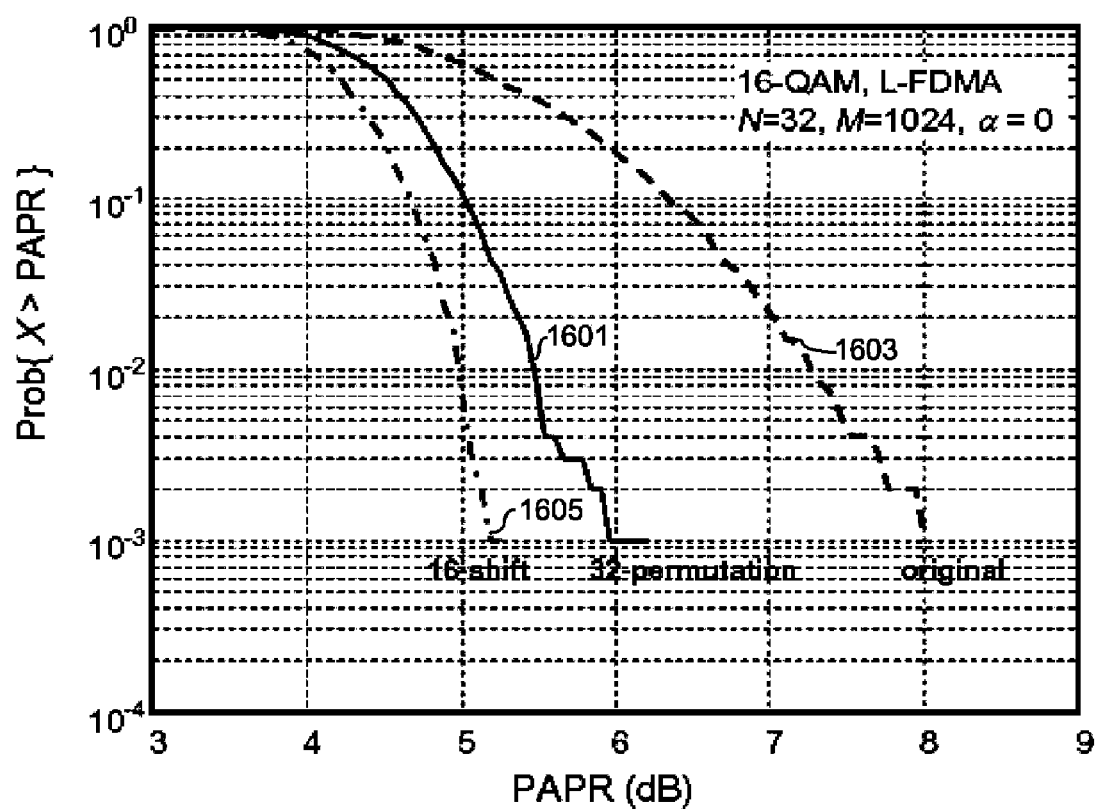
FIG. 16 is a set of graphs depicting PAPR CCDF for the case in which N=32, M=1024, and α=0 in an L-FDMA system employing 16-QAM.

Each permutation has the potential of generating a different PAPR value, and the permutation associated with the lowest PAPR value can be selected for processing, as described earlier in connection with other embodiments that employed circular shifting. FIG. 16 is a set of graphs depicting PAPR CCDF for the case in which N=32, M=1024, and α=0 in an L-FDMA system employing 16-QAM. The solid line (graph 1601) shows the results when 32 permutations are tested. For purposes of comparison, the original CCDF and the results for circular shifts (but with only 16 tests having been carried out) are shown in the dashed (graph 1603) and dot-dashed curves (graph 1605), respectively. Although the binary permutation approach shows a PAPR reduction of about 2 dB compared to conventional processing, the circular shift method outperforms the binary approach, even with only half the number of tests having been performed.

Figure 17:
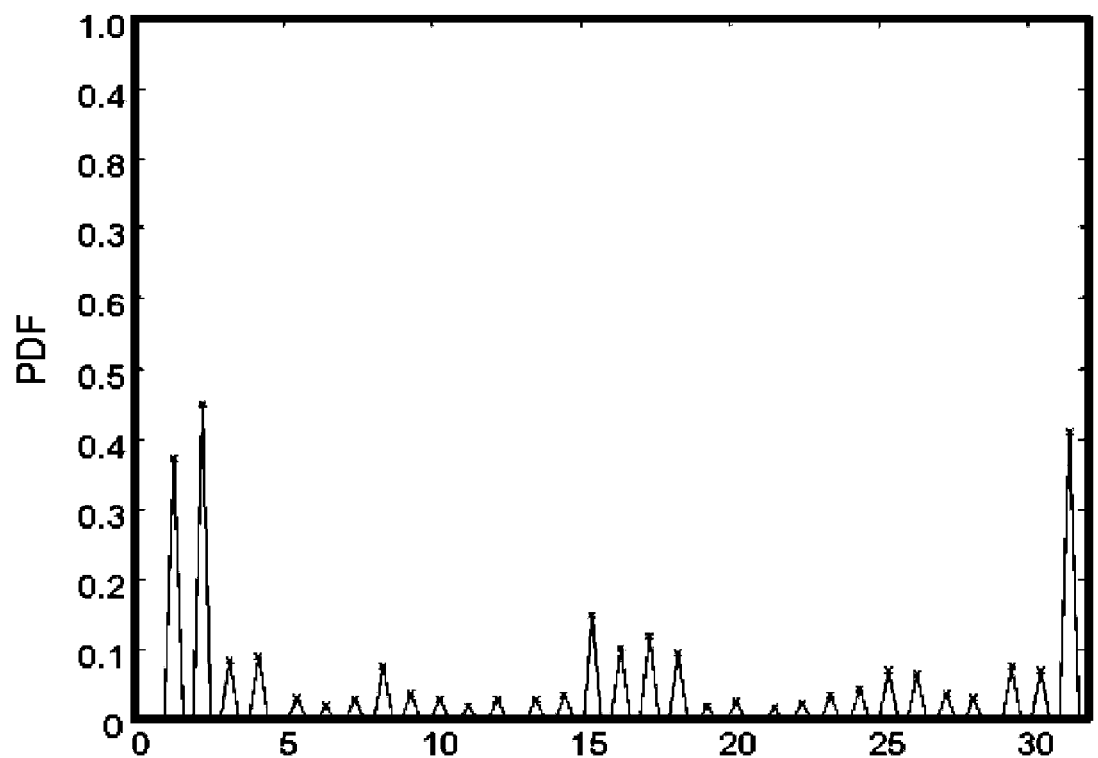
FIG. 17 is an exemplary graph based on test results showing, for each of 32 possible permutations, the probability density function (pdf) representing the probability of that permutation yielding the best reduction of PAPR.

FIG. 17 is an exemplary graph based on test results showing, for each of 32 possible permutations, the probability density function (pdf) representing the probability of that permutation yielding the best reduction of PAPR. Unlike the case with circular shifting (see FIG. 8), the pdf is not uniform over all possible permutations, meaning that the set of selected permutations is not evenly distributed over the set of possible permutations.

Theoretically, for N outputs, there are N! different orderings. In the ultimate case, N! different permutations should be tested to obtain the lowest possible PAPR using this technique. However, this would increase the amount of side information considerably.

Figure 18:
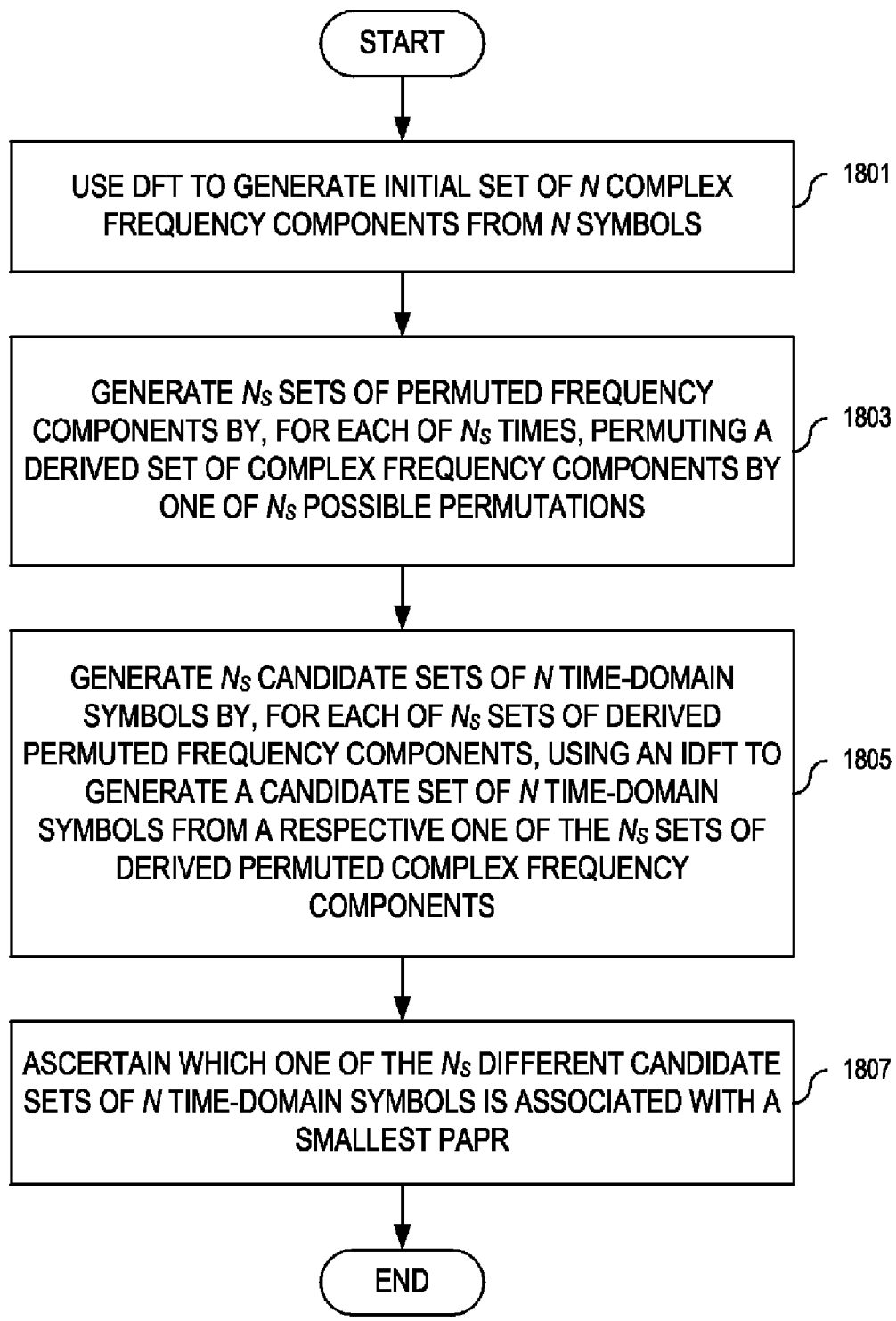
FIG. 18 is a flowchart showing steps/processes involved in a common aspect that enables signals having lower PAPRs to be generated (compared to conventional generation of signals).

From the foregoing descriptions of various alternative embodiments, it will be apparent to those of ordinary skill in the art that a common aspect that enables signals having lower PAPRs to be generated (compared to conventional generation of signals) comprises a number of steps, which may be embodied in corresponding logic that performs these steps. Referring to the flowchart of FIG. 18, these steps are:

Using a Discrete Fourier Transform (DFT) to generate an initial set of N complex frequency components from the N symbols (step 1801).

Generating $N_s$ different sets of permuted complex frequency components by, for each of $N_s$ times, permuting a derived set of complex frequency components by one of $N_s$ possible permutations, where $2 \leq N_s \leq N!$ (step 1803). As used herein, the term "derived set of complex frequency components" is meant to include any of a number of alternative instances in which a set of complex frequency components is derived in some manner from the initial set of N complex frequency components, such as by using the initial set of N complex frequency components unchanged (e.g., as described above in connection with FIG. 10), and by mapping the initial set of N complex frequency components onto a set of M frequency components (e.g., as described above in connection with FIG. 3a). Also, as used herein, the term "permuting" is meant to include circular shifting, binary permutation, and all other permutation possibilities.

Generating $N_s$ candidate sets of N time-domain symbols by, for each of the $N_s$ sets of derived permuted frequency components, using an Inverse Discrete Fourier Transform (IDFT) to generate a candidate set of N time-domain symbols from a respective one of the $N_s$ sets of derived permuted complex frequency components (step 1805). As used herein, the term "derived permuted complex frequency components" means any set of frequency components derived from the permuted complex frequency components, including the permuted complex frequency components themselves (i.e., deriving by using them unchanged), and frequency components generated by processing the permuted complex frequency components. Such processing can include, but is not limited to, mapping and/or shaping such as described earlier in connection with various embodiments. It will be observed that, when shaping is applied, the bandwidth of the resultant signal expands. Consequently, an IDFT with a size bigger than N would be used.

Ascertaining which one of the $N_s$ different candidate sets of N time-domain symbols is associated with a smallest PAPR (step 1807).

Once the candidate set of N time-domain symbols associated with a smallest PAPR is identified, that set can then be selected for further processing as needed by the given application. The particular nature of the processing is not an essential aspect of the invention, and so is not described herein further in detail.

The various embodiments are able to considerably reduce the PAPR of a signal. This directly translates into lower power consumption and heat dissipation by power amplifier circuitry in electronic devices such as a UE. Alternatively, the reduction in PAPR can be used to relax the requirements on shaping filters (e.g., the low-pass filter after the D/A converter in the distributed FDMA transmitter), and also to allow lower roll-off factors which translates into a higher system capacity (i.e., because adjacent channels can be packed closer together).

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of generating a single-carrier signal from a number, N, of symbols, the method comprising:

using a Discrete Fourier Transform (DFT) to generate an initial set of N complex frequency components from the N symbols;

generating $N_s$ different sets of permuted complex frequency components by, for each of $N_s$ times, permuting a derived set of complex frequency components by one of $N_s$ possible permutations, where $2 \leq N_s$, $\leq N!$, wherein the derived set of complex frequency components is derived from the initial set of N complex frequency components;

generating $N_s$ candidate sets of at least N time-domain symbols by, for each of the $N_s$ sets of derived permuted frequency components, using an Inverse Discrete Fourier Transform (IDFT) to generate a candidate set of at least N time-domain symbols from a respective one of the $N_s$ sets of derived permuted complex frequency components, wherein each of the sets of derived permuted complex frequency components is derived from the set of permuted complex frequency components;

ascertaining which one of the $N_s$ different candidate sets of at least N time-domain symbols is associated with a smallest Peak-to-Average-Power Ratio (PAPR); and selecting, for further processing, that one of the $N_s$ different candidate sets of at least N time-domain symbols that is associated with the smallest PAPR, wherein permuting a derived set of complex frequency components by one of $N_s$ possible permutations comprises:

cyclically shifting the derived set of complex frequency components by one of $N_s$ possible shift amounts, $S_i$, wherein $0 \leq S_i \leq (N-1)$ and $S_i \neq S_j$, for $i \neq j$, $0 \leq i \leq (N_s-1)$, $0 \leq j \leq (N_s-1)$.

2. The method of claim 1, wherein the different possible shift amounts, $S_i$, have values that are evenly distributed between 0 and N−1.

3. The method of claim 2, wherein $N_s=2$, $S_0=0$ and $S_1=(N/2)$.

4. The method of claim 2, wherein $N_s=4$, $S_0=0$, $S_1=(N/4)$, $S_2=(N/2)$, and $S_3=(3N/4)$.

5. The method of claim 1, wherein the derived set of complex frequency components are identical to the initial set of complex frequency components.

6. The method of claim 1, comprising deriving the derived set of complex frequency components from the set of initial complex frequency components by performing a process that includes:

repeatedly mapping the N complex frequency components of the initial set of N complex frequency components onto different groups of N carrier frequencies selected from among M carrier frequencies until each of the M carrier frequencies is associated with one of the N complex frequency components.

7. The method of claim 6, comprising deriving each of the sets of derived permuted complex frequency components from the set of permuted complex frequency components by performing a process that includes using a shaping filter to reduce PAPR.

8. The method of claim 1, comprising deriving each of the sets of derived permuted complex frequency components from the set of permuted complex frequency components by performing a process that includes:
generating $N_s$ different sets of M complex frequency components, where $N \leq M$, by, for each of the $N_s$ different sets of N permuted complex frequency components, repeatedly mapping the N permuted complex frequency components onto different groups of N carrier frequencies selected from among M carrier frequencies until each of the M carrier frequencies is associated with one of the N complex frequency components.

9. The method of claim 8, wherein the process for deriving each of the sets of derived permuted complex frequency components from the set of permuted complex frequency components includes using a shaping filter to reduce PAPR.

10. The method of claim 1, comprising deriving each of the sets of derived permuted complex frequency components from the set of permuted complex frequency components by performing a process that includes:
generating $N_s$ different sets of M complex frequency components, where $N \leq M$, by, for each of the $N_s$ different sets of N permuted complex frequency components, mapping the N permuted complex frequency components onto every Kth carrier selected from among M carrier frequencies, wherein $K = M/N$.

11. The method of claim 10, comprising performing the further processing, wherein the further processing includes converting the selected at least N time-domain symbols into an analog signal, and shaping the analog signal to reduce the PAPR.

12. The method of claim 1, comprising deriving the set of derived complex frequency components from the set of initial complex frequency components by performing a process that includes:
generating a set of M complex frequency components, where $N \leq M$, by mapping the N complex frequency components of the initial set of complex frequency components onto every Kth carrier selected from among M carrier frequencies, wherein $K = M/N$.

13. The method of claim 12, comprising performing the further processing, wherein the further processing includes converting the selected at least N time-domain symbols into an analog signal, and shaping the analog signal to reduce the PAPR.

14. The method of claim 1, comprising communicating information to a receiver, wherein the information identifies which of the $N_s$ possible permutations was used to generate the selected candidate set of at least N time-domain symbols.

15. The method of claim 1, comprising performing the further processing, wherein the further processing includes using the selected at least N time-domain symbols in a process that generates an analog signal; and
transmitting the analog signal.

16. An apparatus for generating a single-carrier signal from a number, N, of symbols, the apparatus comprising:
Discrete Fourier Transform (DFT) logic that generates an initial set of N complex frequency components from the N symbols;
logic that generates $N_s$ different sets of permuted complex frequency components by, for each of $N_s$ times, permuting a derived set of complex frequency components by one of $N_s$ possible permutations, where $2 \leq N_s \leq N!$, wherein the derived set of complex frequency components is derived from the initial set of N complex frequency components;
logic that generates $N_s$ candidate sets of at least N time-domain symbols by, for each of the $N_s$ sets of derived permuted frequency components, using an Inverse Discrete Fourier Transform (IDFT) to generate a candidate set of at least N time-domain symbols from a respective one of the $N_s$ sets of derived permuted complex frequency components, wherein each of the sets of derived permuted complex frequency components is derived from the set of permuted complex frequency components;
logic that ascertains which one of the $N_s$ different candidate sets of at least N time-domain symbols is associated with a smallest Peak-to-Average-Power Ratio (PAPR); and
selecting logic that selects, for further processing, that one of the $N_s$ different candidate sets of at least N time-domain symbols that is associated with the smallest PAPR,
wherein the logic that generates $N_s$ different sets of permuted complex frequency components comprises:
logic that cyclically shifts the derived set of complex frequency components by at least one of $N_s$ possible shift amounts, $S_i$, wherein $0 \leq S_i \leq (N-1)$ and $S_i \neq S_j$, for $i \neq j$, $0 \leq i \leq (N_s-1)$, $0 \leq j \leq (N_s-1)$.

17. The apparatus of claim 16, wherein the different possible shift amounts, $S_i$, have values that are evenly distributed between 0 and N−1.

18. The apparatus of claim 17, wherein $N_s=2$, $S_0=0$ and $S_1=(N/2)$.

19. The apparatus of claim 17, wherein $N_s=4$, $S_0=0$, $S_1=(N/4)$, $S_2=(N/2)$, and $S_3=(3N/4)$.

20. The apparatus of claim 16, wherein the derived set of complex frequency components are identical to the initial set of complex frequency components.

21. The apparatus of claim 16, comprising logic that derives the derived set of complex frequency components from the set of initial complex frequency components by performing a process that includes:
repeatedly mapping the N complex frequency components of the initial set of N complex frequency components onto different groups of N carrier frequencies selected from among M carrier frequencies until each of the M carrier frequencies is associated with one of the N complex frequency components.

22. The apparatus of claim 21, comprising logic that derives each of the sets of derived permuted complex frequency components from the set of permuted complex frequency components by performing a process that includes using a shaping filter to reduce PAPR.

23. The apparatus of claim 16, comprising logic that derives each of the sets of derived permuted complex frequency components from the set of permuted complex frequency components by performing a process that includes:
generating $N_s$ different sets of M complex frequency components, where $N \leq M$, by, for each of the $N_s$ different sets of N permuted complex frequency components, repeatedly mapping the N permuted complex frequency components onto different groups of N carrier frequencies selected from among M carrier frequencies until each of the M carrier frequencies is associated with one of the N complex frequency components.

24. The apparatus of claim 23, comprising a shaping filter used to reduce PAPR in the process for deriving each of the sets of derived permuted complex frequency components from the set of permuted complex frequency components.

25. The apparatus of claim 16, comprising logic that derives each of the sets of derived permuted complex frequency components from the set of permuted complex frequency components by performing a process that includes:
generating $N_s$ different sets of M complex frequency components, where $N \leq M$, by, for each of the $N_s$ different sets of N permuted complex frequency components, mapping the N permuted complex frequency components onto every Kth carrier selected from among M carrier frequencies, wherein K=M/N.

26. The apparatus of claim 25, comprising logic that converts the selected at least N time-domain symbols into an analog signal, and shapes the analog signal to reduce the PAPR.

27. The apparatus of claim 16, comprising logic that derives the set of derived complex frequency components from the set of initial complex frequency components by performing a process that includes:
generating a set of M complex frequency components, where $N \leq M$, by mapping the N complex frequency components of the initial set of complex frequency components onto every Kth carrier selected from among M carrier frequencies, wherein K=M/N.

28. The apparatus of claim 27, comprising logic that converts the selected at least N time-domain symbols into an analog signal, and shapes the analog signal to reduce the PAPR.

29. The apparatus of claim 16, comprising logic that communicates information to a receiver, wherein the information identifies which of the $N_s$ possible permutations was used to generate the selected candidate set of at least N time-domain symbols.

30. The apparatus of claim 16, comprising:
logic that uses the selected at least N time-domain symbols in a process that generates an analog signal; and
logic that transmits the analog signal.

* * * * *

UNITED STATES PATENT AND TRADEMARK OFFICE
CERTIFICATE OF CORRECTION

PATENT NO. : 7,848,446 B2
APPLICATION NO. : 11/684683
DATED : December 7, 2010
INVENTOR(S) : Haartsen Page 1 of 1

It is certified that error appears in the above-identified patent and that said Letters Patent is hereby corrected as shown below:

In Column 4, Line 25, delete "of$N_S$" and insert -- of $N_S$ --, therefor.

In Column 7, Line 50, delete "factor a" and insert -- factor $\alpha$ --, therefor.

In Column 12, Line 39, delete "$C_i$" and insert -- $c_i$ --, therefor.

In Column 14, Line 28, in Claim 1, delete "$2 \leqq N_s, \leqq N!$," and insert -- $2 \leqq N_s \leqq N!$, --, therefor.

In Column 16, Line 32, in Claim 16, delete "$S_{i \# Sj}$," and insert -- $S_i \# S_j$, --, therefor.

Signed and Sealed this
Twelfth Day of April, 2011

David J. Kappos
*Director of the United States Patent and Trademark Office*